United States Patent
Tahara et al.

[19]

[11] Patent Number: 5,909,551
[45] Date of Patent: Jun. 1, 1999

[54] INTERACTIVE RECORDING/ REPRODUCING MEDIUM AND REPRODUCING SYSTEM

[75] Inventors: Mika Tahara, Yokohama; Takashi Takeuchi, Fujisawa; Toshiyuki Oda, Yokohama, all of Japan

[73] Assignee: Hitachi, Ltd., Tokyo, Japan

[21] Appl. No.: 08/694,661

[22] Filed: Aug. 9, 1996

[30] Foreign Application Priority Data

Aug. 25, 1995 [JP] Japan .................................. 7-217002
Dec. 27, 1995 [JP] Japan .................................. 7-340354

[51] Int. Cl.$^6$ .................................................. G03G 7/00
[52] U.S. Cl. .............................. 395/200.61; 395/200.32; 360/27; 360/39
[58] Field of Search ........................ 395/497.01, 200.61, 395/200.32, 200.68; 360/27, 39; 358/462; 707/100, 102, 104, 513

[56] References Cited

U.S. PATENT DOCUMENTS 5,233,438  8/1993  Funahashi ............................... 358/341

FOREIGN PATENT DOCUMENTS 4227381  8/1992  Japan .

OTHER PUBLICATIONS

Nikkei Electronics 1993, No. 594, pp. 169–175.

*Primary Examiner*—Thomas Peeso
*Attorney, Agent, or Firm*—Antonelli, Terry, Stout & Kraus, LLP

[57] ABSTRACT

An interactive recording/reproducing medium including: image data; image reproduction control data which defines an operation instruction received from operation input apparatus and a reproduction procedure for the image data in correlation with each other, the operation input apparatus performing a reproducing operation for the image data in an interactive manner; image related data related to the contents of the image data; and relation defining information which defines the relation between the image related data and the image data. More particularly, an interactive recording/ reproducing system which is interactively responsive to operations made by a user, which defines information such as text data (e.g., ASCII text) in association with an image and reproduces the text data simultaneously with reproduction of the image. An optical disk medium comprises a Video-CD recording area for recording image data (e.g. dynamic images, static images, voice) which conform to a basic Video-CD standard, a PC data recording area for recording text data associated with the image data, and a reproduction application recording area for recording a program to effect reproduction using a PC (personal computer). A Video-CD reproducing system and a PC can be alternatively used to perform reproduction using a content of the optical disk medium.

29 Claims, 24 Drawing Sheets

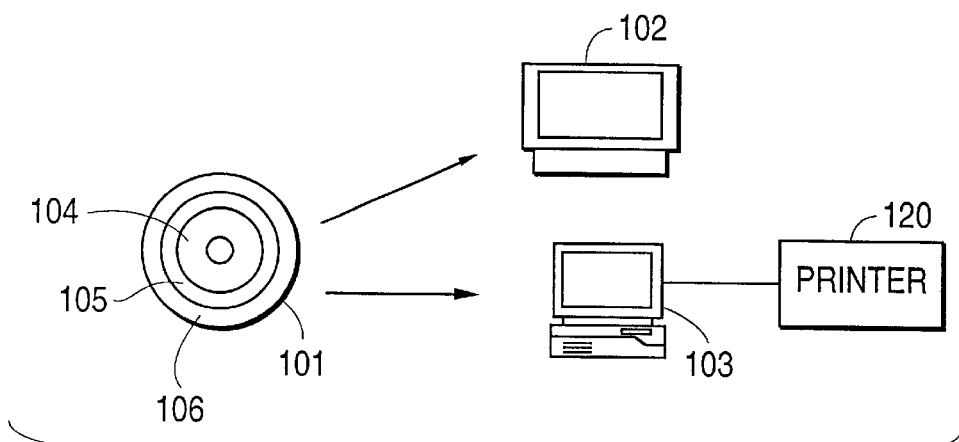
FIG. 1
FIG. 2
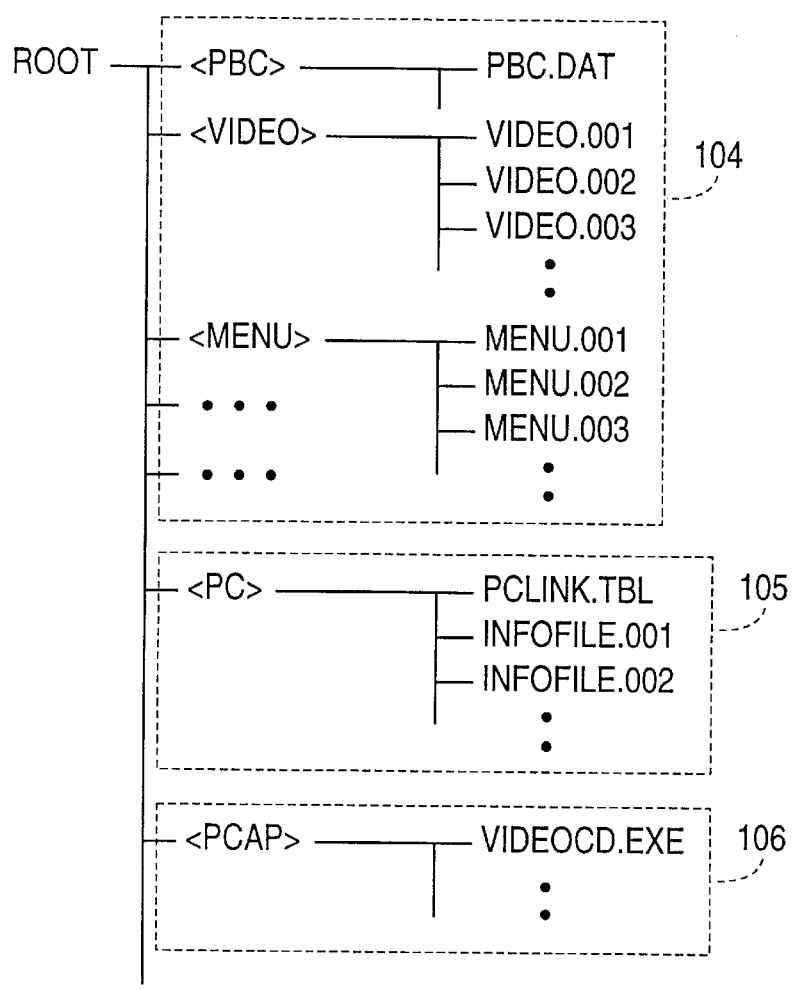

| NODE NUMBER | 1 |
| IMAGE DATA | MENU.001 |

| EVENT | CORRESPONDING NODE NUMBER |
|---|---|
| PREVIOUS | — |
| NEXT | 2 |
| RETURN | — |
| SELECT1 | 3 |
| SELECT2 | 4 |
| REPRODUCTION END | 1 |

| NODE NUMBER | 3 |
| IMAGE DATA | VIDEO.001 |

| EVENT | CORRESPONDING NODE NUMBER |
|---|---|
| PREVIOUS | — |
| NEXT | 4 |
| RETURN | 1 |
| REPRODUCTION END | 4 |

| USER'S OPERATION | REPRODUCTION START | KEY INPUT OF SELECT1 |
|---|---|---|
| OUTPUT DISPLAY | UNIT 1<br>1. LESSON 1<br>2. LESSON 2<br>401 | GOOD MORNING!<br>402 |

| IMAGE FILE | TEXT DATA | KEYWORD |
|---|---|---|
| VIDEO.001 | INFOFILE.001 | HOW TO GREET |
| | INFOFILE.002 | HOW TO ANSWER |
| | INFOFILE.003 | HOW TO SELF-INTRODUCE |
| VIDEO.002 | ....... | ....... |
| | ....... | ....... |
| | ....... | ....... |
| ....... | ....... | ....... |

FIG. 9

| USER'S OPERATION | REPRODUCTION START | KEY INPUT OF SELECT1 | SELECTION OF KEYWORD DISPLAY BUTTON | SELECTION OF KEYWORD "HOW TO GREET" |
|---|---|---|---|---|
| OUTPUT DISPLAY 1 | UNIT 1<br>1. LESSON 1<br>2. LESSON 2 | GOOD MORNING! | GOOD MORNING! | GOOD MORNING! |
| OUTPUT DISPLAY 2 | | | HOW TO GREET<br>HOW TO ANSWER<br>HOW TO SELF-INTRODUCE | HOW TO GREET<br>MORNING GREETING: GOOD MORNING.<br>AFTERNOON GREETING: GOOD AFTERNOON.<br>EVENING GREETING: GOOD EVENING. |

FIG. 18

```
START
  ↓  ⌐1801
EXECUTION OF COMMODITY
ORDER APPLICATION
  ↓  ⌐1802
REFER TO IMAGE-PC DATA
LINK TABLE
  ↓  ⌐1803
CREATION OF ORDER
INFORMATION
  ↓  ⌐1804
TRANSMISSION OF
ORDER INFORMATION
  ↓
END
```

FIG. 19

| IMAGE REPRODUCTION CONTROL DATA | PASSWORD |
|---|---|
| PBC1.DAT | z n e d o s |
| PBC2.DAT | q p d a j f |
| PBC3.DAT | i b v r g k |
| ....... | ....... |

| NODE NUMBER | IMAGE DATA | KEY 1 | KEY 2 | KEY 3 | RETURN | PREV | NEXT |
|---|---|---|---|---|---|---|---|
| 1 | MENU0001.DAT | NODE 2 | NODE 3 | NODE 4 | — | — | — |
| 2 | VIDEO001.DAT | — | — | — | NODE 1 | — | — |
| 3 | VIDEO002.DAT | — | — | — | NODE 1 | — | — |
| 4 | MENU002.DAT | — | — | — | NODE 1 | — | NODE 5 |
| ⋮ | ⋮ | ⋮ | ⋮ | ⋮ | ⋮ | ⋮ | ⋮ |

FIG. 27a

INDEX.HTM

```
< HTML >
< ! - - VIDEOCD+HTML DOCUMENT - - >
<TITLE> Go Go Ethnic ! < /TITLE >
< BODY >
< IMG SRC =" . . /GIF/MENU001.GIF" > < BR >
< A HREF =" PAGE001.HTM" >
< IMG SRC =" . . /GIF/KEY1.GIF" > < /A >
< A HREF ="PAGE002.HTM" >
< IMG SRC =" . . /GIF/KEY2.GIF" > < /A >
< A HREF ="PAGE003.HTM" >
< IMG SRC =" . . /GIF/KEY3.GIF" > < /A >
< /BODY >
< /HTML >
```

FIG. 27b

PAGE001.HTM

```
< HTML >
< ! - - VIDEOCD+HTML DOCUMENT - - >
<TITLE> Ethnic Curry < /TITLE >
< BODY >
< A HREF =" . . / . . /VIDEO/VIDEO001.DAT" >
< IMG SRC =" . . /GIF/VIDEO001.GIF" > < BR >
How to make Ethnic Curry < /A > < BR >
< A HREF =" INDEX.HTM" >
< IMG SRC =" . . /GIF/RETURN.GIF" > < /A > < BR >
< /BODY >
< /HTML >
```

FIG. 28a

PAGE003.HTM

```
< HTML >
< ! - - VIDEOCD+HTML DOCUMENT - - >
<TITLE> Spices < /TITLE >
< BODY >
< IMG SRC =" . . /GIF/MENU002.GIF" > < BR >
< A HREF =" INDEX.HTM" >
< IMG SRC =" . . /GIF/RETURN.GIF" > < /A >
< A HREF =" PAGE004.HTM" >
< IMG SRC =" . . /GIF/NEXT.GIF" > < /A > < BR >       — 2801
< A HREF =" http: / / www.ethnic.xxx.xxx/order1.htm" >
Order ¥200 < /A > < BR >
< /BODY >
< /HTML >
```

FIG. 28b

ORDER1.HTM

```
< HTML >
< ! - - VIDEOCD+HTML DOCUMENT - - >
<TITLE> Spices Order 1 < /TITLE >
< BODY >
< U > Order of Spice < /U > < BR >                    — 2802
< IMG SRC =" . . /GIF/SPICE1.GIF" >Cumin < BR >
¥200 < BR >                                           — 2803
< FORM METHOD ="POST" ACTION ="cgi-bin/post-query" >
Member ID < INPUT TYPE =" text " NAME ="id" > < BR >
< INPUT TYPE ="submit" VALUE ="Confirm" >            — 2804
< INPUT TYPE =" reset " VALUE ="Cancel" >            — 2805
< /FORM >
```

INTERACTIVE RECORDING/REPRODUCING MEDIUM AND REPRODUCING SYSTEM

BACKGROUND OF THE INVENTION

1. Field of the Invention

The present invention relates to an information recording system (e.g. optical disk) in which is recorded with multimedia information including images such as dynamic and static images, as well as voice. Particularly, the invention is concerned with an interactive recording/reproducing system which is correlated interactively with operations made by a user using a personal computer or the like and which reproduces multimedia information and text data from a package medium such as an optical disk and a network medium.

2. Description of Related Art

With regard to a multimedia information recording system which is interactively correlated with operations of a user, a Video-CD was introduced in Nikkei Electronics (Nov. 8, 1993). In such a CD-ROM of this Video-CD, there are recorded image data such as dynamic and static images, audio data such as music and accompanying sound effects, and further, reproduction control data which control reproduction of the image data and audio data in accordance with operations of a user. By utilizing the recorded reproduction control data, the Video-CD realizes reproduction which is interactive with the user. Further, the Video-CD defines a file system conforming to ISO 9660 as a recording system for a CD-ROM, and has been reportedly easily reproducible with a corresponding personal computer provided with means for reproducing image data (conforming to the MPEG standard).

Further, as a system which is a combination of a computer and image data, a picture-in-picture system was disclosed in Japanese Patent Laid-Open No. Hei 4-227381 (1992). According to this system, image data stored in a video RAM disposed within a TV set is transferred through a computer interface to a computer having an external recording medium, thereby permitting a common utilization of image data between the two.

The teachings of each of the above-listed and any below-listed references are herein incorporated by reference.

Turning now to problems in the art, the Video-CD standard does not define any reproduction procedure in a case where text data is used as reproduction data, although image data and audio data can be reproduced using a personal computer. In the case of a character display, therefore, there is no other way than recording text data as image data of the character display, thus resulting in a data volume that becomes considerably larger in comparison with other text data (e.g., ASCII text data) having the same character information.

Further, according to the above-described picture-in-picture system, it is possible to fetch image data in a TV set into a computer, but nothing is shown therein about the relation between the image data thus taken in and the data presented by the personal computer itself.

SUMMARY OF THE INVENTION

In view of the above-mentioned problems, the present invention has an object to provide an interactive recording/reproducing system which is responsive interactively to operations performed by a user, which can define information capable of being controlled by a personal computer (such as text data in association with an image), and which can record such text data in a same recording medium as that for image data while containing much information (e.g., text data) with a small data volume.

According to the present invention, in order to achieve the above-mentioned object, there are used dynamic images, static images, voice, and image data as a combination thereof; operation input means which performs an image data reproducing operation interactively; image reproduction control data which defines an operation instruction received from the operation input means and an image data reproducing procedure in correlation with each other; image data reproducing means which receives an operation instruction from the operation input means, acquires a corresponding reproduction procedure from the image reproduction control data, and reproduces the image data in accordance with the reproduction procedure acquired; image related data related to the contents of the image data; relation defining information which defines the relation between the image related data and the image data; and image related data reproducing means which acquires from the relation defining information the image related data related to the image data being reproduced and reproduces it together with reproduction of the image data.

Further, external information defining data for obtaining multimedia data through a communication line is recorded in a medium. In addition, the image data and the image reproduction control data are recorded in accordance with a basic Video-CD standard, and the image related data and the external information defining data are recorded as a file of a HTML (Hyper Text Markup Language) format used in the Internet. Moreover, in obtaining multimedia data from a location exterior to the system, a URL (Uniform Resource Locator) indicating the location of the multimedia data are described in the file of HTML format, making it possible to obtain data from an appropriate WWW (World Wide Web) server.

According to the interactive recording/reproducing system of the present invention, the image data reproducing means receives an operation instruction from the operation input means, acquires a corresponding reproduction procedure from the image reproduction control data, and reproduces image data in accordance with the reproduction procedure acquired. At the same time, the image related data reproducing means acquires from the relation defining information the image related data related to the image data being reproduced and reproduces the acquired image related data. The image data, the image reproduction control data, the image related data and the relation defining information are recorded in a single recording medium. The image data reproducing means and the image related data reproducing means read out each information from the single recording medium and reproduce it.

Further, in reproducing a file of a HTML format, the reproducing means reproduces the image data with reference to the file of the HTML format, and obtains and then reproduces the multimedia data through the communication line. In obtaining the multimedia data, the URL described in advance in the file of HTML format are referred to, and the data is obtained from an appropriate WWW server through the communication means for reproduction.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments at the time the patent application was filed in order to teach one skilled in the art to make and use the invention, and to otherwise satisfy the best mode disclosure requirements under U.S. patent law, it should be clearly understood that the same is by way of illustration and example only and is not to be taken by way of limitation, the spirit and scope of the present invention being basic only by the terms of the appended claims.

BRIEF DESCRIPTION OF THE DRAWING(S)

The following represents brief descriptions of the drawings, wherein:

FIG. 1 is a diagram showing the construction of an interactive recording/reproducing system embodying the present invention;

FIG. 2 is a diagram showing an example of a directory structure of an optical disk medium embodying the present invention;

FIG. 9 is a diagram showing an example of operation made by the user and a corresponding output display in the first embodiment;

FIG. 18 is a diagram showing the flow of operations of image data display means in the third embodiment;

FIG. 19 is a diagram showing an example of image reproduction control data management table in the fourth embodiment of the present invention;

Figures 25A, 25B:
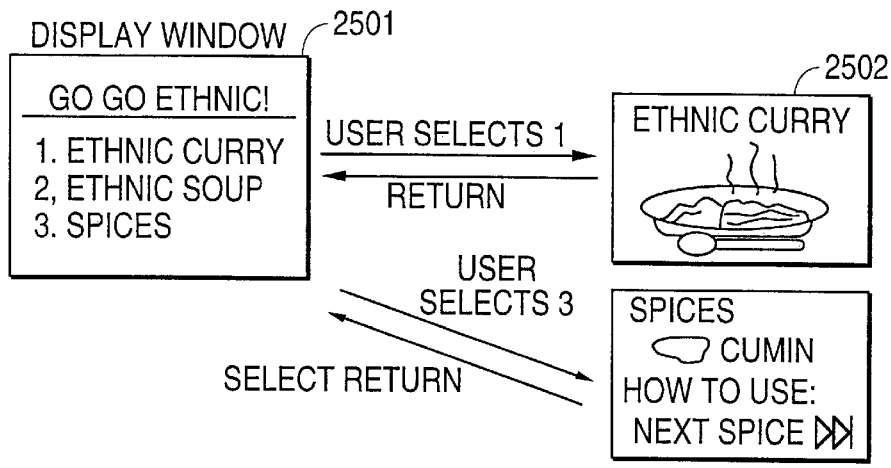
Figure 26:
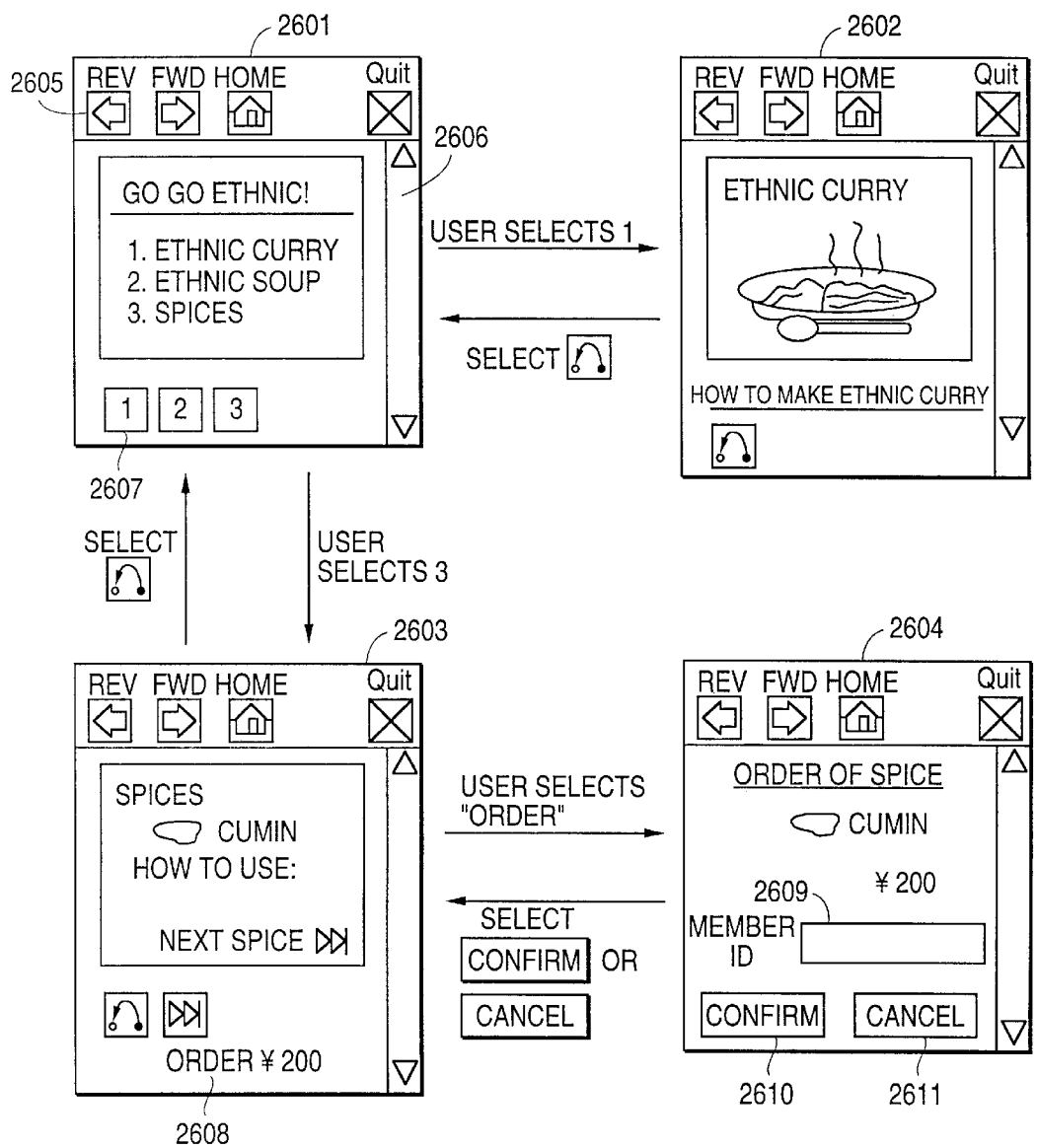

FIGS. 25a–b are a display example of reproducing an optical disk medium embodying the present invention using a basic Video-CD reproducing means;

FIG. 26 is a display example of reproducing an optical disk medium embodying the present invention using a WWW browser;

FIGS. 27a–b are diagrams showing the contents of a file of HTML format recorded in an optical disk medium embodying the present invention; and FIGS. 28a–b are diagrams showing the contents of a file of HTML format recorded in an optical disk medium embodying the present invention.

DETAILED DESCRIPTION OF THE PREFERRED EMBODIMENTS OF THE INVENTION

Before beginning a detailed description of the subject invention, mention of the following is in order:

When appropriate, like reference numerals and characters are used to designate identical, corresponding or similar components in differing figure drawings.

In the following discussions, "PC" is an abbreviation standing for "personal computer".

Turning now to a detailed description of a preferred embodiment of the invention, FIG. 1 is a diagram showing an example of construction of an interactive image recording/reproducing system according to the present invention. In FIG. 1 there are illustrated a logical structure of an optical disk medium 101 and reproducing systems for reproducing such medium. The optical disk medium 101 comprises a Video-CD recording area 104, a PC data recording area 105 and a PC application recording area 106. The Video-CD as referred to herein takes into consideration an industry standard relating to a digital image recording/reproducing system using a compact disk.

According to the present invention, image data (dynamic and static images, voice, and a combination thereof) conforming to a Video-CD standard is recorded in the Video-CD recording area 104, text data related to the image data is recorded in the PC data recording area 105, and a program for effecting reproduction of the image data and the text data by a PC is recorded in the PC application recording area 106. The optical disk medium 101 is reproduced either by using a Video-CD reproducing system 102 which is a combination of a TV set and a Video-CD player, or by using a personal computer 103 (hereinafter referred to simply as PC 103) having a function (e.g., MPEG decoder) to reproduce image data conforming to the Video-CD standard. According to the present invention, the Video-CD reproducing system 102 performs reproduction conforming to the Video-CD standard using means which will be described later, while the PC 103 executes a PC application recorded in the PC application recording area 106 using means to be described later.

FIG. 2 shows an example of a directory structure in the optical disk medium 101. According to this directory structure, recording is made taking into consideration the ISO 9660 standard (a standard relating to a disk structure of a CD-ROM). The same figure illustrates a tree structure of a logical directory hierarchy, wherein, for the name of each node portion, a directory name is bracketed (<,>), while a file name is shown without brackets. For example, <ROOT> indicates a root directory which includes some subdirectories, and PBC.DAT stands for a single particular file. The Video-CD recording area 104, PC data recording area 105 and PC application recording area 106 shown in FIG. 1 correspond to areas 104, 105 and 106, respectively, which are enclosed with dotted lines in FIG. 2.

The structure of a directory and a file recorded in the Video-CD recording area 104 is standardized, which standard defines that necessary files should be recorded in conformity with ISO 9660. The structure in question comprises a directory (<VIDEO> in FIG. 2) for recording MPEG (a standard relating to image compression), image data (e.g. VIDEO.001, VIDEO.002 in the same figure) according to MPEG, a directory (<MENU>) for recording MPEG image data (e.g. MENU.001, MENU.002) used in, for example, displaying a menu, and a directory (<PBC>) for recording image reproduction control data (PBC.DAT) describing a file reproduction procedure.

The file names and directory names depicted in the figure are not the same as those defined by the Video-CD standard, nor do they show all of the files defined by the same standard. More particularly, the PC data recording area 105 is newly added in the present invention and is herein depicted as having a directory <PC>. In the PC data recording area 105, there are recorded text files (INFOFILE.001, INFOFILE.002 in FIG. 2) which are related to the image data recorded in the Video-CD recording area 104, and a link table (PCLINK.TBL) for providing correlation. The PC application recording area 106 is newly added in the invention and is herein depicted as having a directory <PCAP>. In the area 106, there is recorded a program file (VIDEOCD.EXE) for performing reproduction of image data and text data by means of a PC.

Figures 3A, 3B, 4:
FIGS. 3a and 3b are diagrams showing part of image reproduction control data according to a basic Video-CD standard.
FIG. 4 is a diagram showing an example of operation made by a user and a corresponding output display in a basic Video-CD player.
Figure 6:
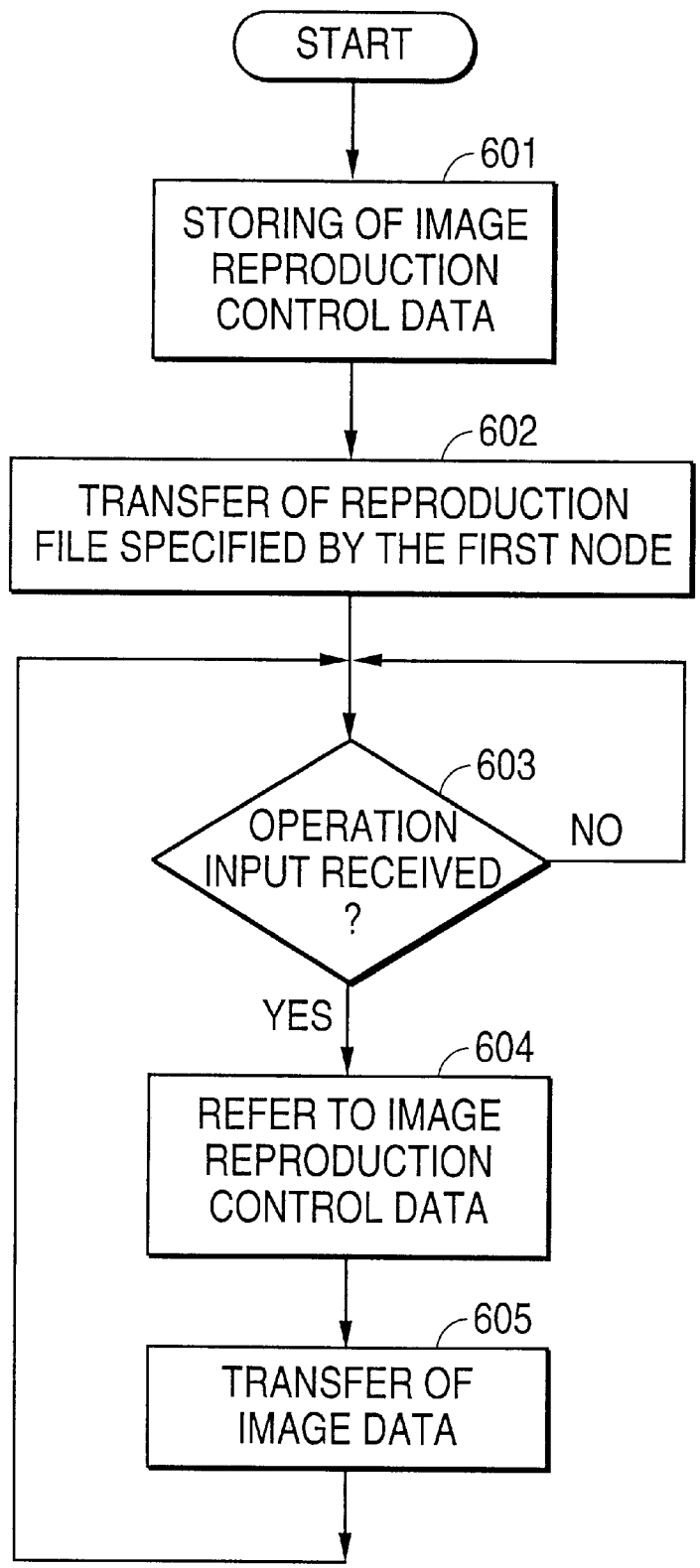
FIG. 6 is a diagram showing a flow of operations of a basic Video-CD player.

Description will be first be directed to an interactive image reproducing procedure conforming to a basic Video-CD with reference to FIGS. 3a–b to 6. More particularly, FIGS. 3a–b show an example of a portion of the image reproduction control data (PBC.DAT in FIG. 2). The format of the image reproduction control data is defined by a basic Video-CD standard. Such basic standard prescribes reproduction procedure describing units for image data (one or plural) to be displayed for particular ones of (i.e., corresponding to) user operations or various events. In the present invention, the reproduction unit is expressed as a node. The image reproduction control data give independent node numbers to plural nodes, and describe a reproduction procedure for each node.

As one example, FIGS. 3(*a*) and (*b*) are examples showing reproduction procedures for node numbers 1 and 3. FIG. 3(*a*) indicates that the node number is 1 and that the file name of the image data reproduced at the node number 1 is MENU.001. Further, for user operations or events, a node number to be shifted to next (in response to a user input) is designated. For example, in a case where node number 1 (FIG. 3*a*) is being effect and where a key input made by a user is a PREVIOUS indication (which means "Return to previous"), no reaction occurs, that is, the key input is ignored. In contrast, where the user key input is SELECT1, the node corresponding to SELECT1 is 3, such that a shift is made to the node number 3 (FIG. 3*b*). Upon shift to the node number 3, the reproduction procedure for the node number 3 (FIG. 3*b*) is acquired from among the image reproduction control data and reproduction control is made in accordance with the acquired reproduction procedure. FIG. 3*b* is a diagram showing the reproduction procedure for the node number 3, describing that image data VIDEO.001 should be reproduced first.

In the above-described FIGS. 3*a–b* there are shown only two nodes, but in a practical application, plural such nodes are typically included in the image reproduction control data. Although the identity of image data to be reproduced is specified in terms of a file name, there may be used, for example, a recording address on a CD-ROM if it can be identified. As to the event names shown in FIG. 3, PREVIOUS means "Return to previous," NEXT means "Advance to next," RETURN means "Return to the previous menu," SELECTxx means "Select key number xx" (the mark xx should be replaced by a number), and REPRODUCTION END means the end of image data reproduction. Such listing is only exemplary, and is not an exhaustive list of possible types of events within the basic Video-CD standard.

FIG. 4 shows an example of user operations and corresponding output displays in the case of reproducing the optical disk medium 101 by the Video-CD reproducing system 102, in accordance with the image reproduction control data shown in FIGS. 3*a–b*. More particularly, assuming the node in FIG. 3(*a*) represents a beginning of an image reproduction control data, upon start of reproduction of the optical disk medium 101, the Video-CD reproducing system 102 reproduces the image data MENU.001 described at the node number 1 (output display 401 in FIG. 4). This output display shows the user that it is necessary to select either Lesson 1 or Lesson 2 with a key number 1 or a key number 2. Next, when the user makes key input of SELECT1, the Video-CD reproducing system 102 acquires the reproduction control data of the node number 3 corresponding to the SELECT1 event of the node number 1, and displays the image data VIDEO.001 described in the node number 3 (output display 402 in FIG. 4).

Figure 5:
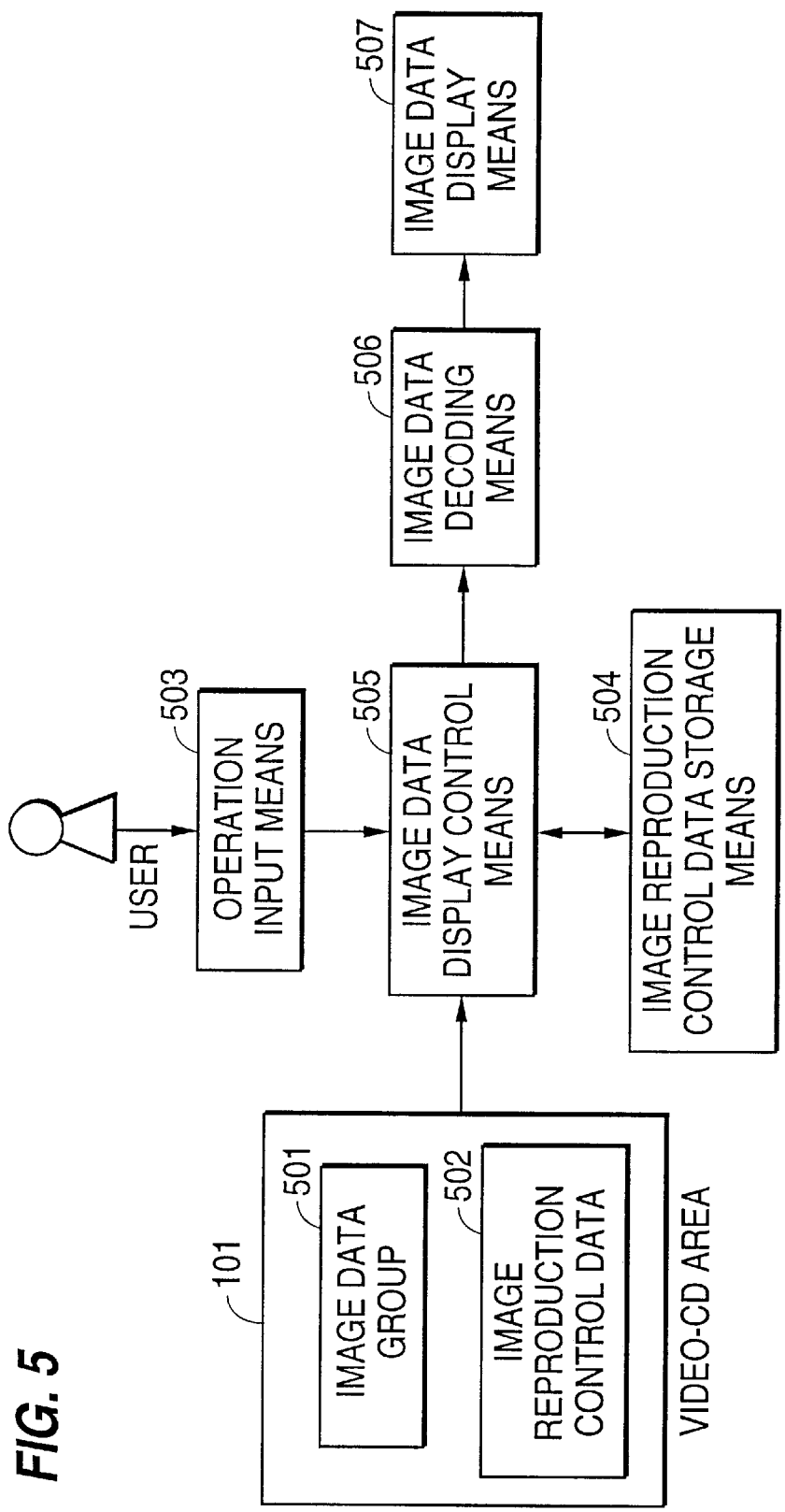
FIG. 5 is a diagram showing an example of construction of a basic Video-CD player.

The above operations of the Video-CD reproducing system 102 will be explained below with reference to FIGS. 5 and 6. More particularly, FIG. 5 shows an example of construction of the Video-CD reproducing system 102. In FIG. 5, numeral 501 denotes an image data group recorded in the Video-CD recording area 104, which data group is a collection of the image data (e.g. VIDEO.001, MENU.001) shown in FIG. 2. Numeral 502 denotes the image reproduction control data (PBC.DAT in FIG. 2) for controlling the reproduction of the image data group 501. The blocks of numerals 503 to 507 constitute the Video-CD reproducing system 102. More specifically, numeral 503 denotes operation input means for operation input by the user, which input means is constituted, for example, by using an infrared remote controller, an infrared receiver, an input code generator, and/or a keyboard, etc. Numeral 504 denotes image reproduction control data storage means constituted, for example, by using a semiconductor memory which stores the image reproduction control data 502. Numeral 505 denotes image data display control means for controlling the reproduction of image in accordance with the image reproduction control data 502. Numeral 506 denotes image data decoding means which has a function of decoding MPEG image data. Numeral 507 denotes image data display means for displaying the decoded image data.

FIG. 6 is a flowchart showing a flow of operations of the image data display control means 505 after insertion of the optical disk medium 101 into the Video-CD reproducing system 102. More particularly, upon insertion of the optical disk medium 101 into the Video-CD reproducing system 102, the image data display control means 505 reads the image reproduction control data 502 from the optical disk medium 101 and stores it in the image reproduction control data storage means 504 (step 601). Next, the display control means 505 reads from the image data group 501 the image data specified by the node written at the beginning of the image reproduction control data 502, and transfers it to the image data decoding means 506 (step 602). The decoding means 506 decodes the image data and transfers the decoded data to the image data display means 507, which in turn displays the decoded image data. The image data display control means 505 stands by until input of an operation is made by a user (or until the end of reproduction of the read image data) (step 603).

Next, upon receipt of an operation input from the user (or upon the completion of the image data reproduction), the image data display control means 505 makes reference to the node number corresponding to the received operation input (or reproduction end) from the image reproduction control data 502 stored in the image reproduction control data storage means 504, and acquires the reproduction control data of that node number (step 604). Then, the display control means 505 reads the image data described in that node from the image data group and transfers it to the image data decoding means 506 (step 605). Subsequently, the operations 603 to 605 are repeated.

As explained above, the basic Video-CD reproducing system 102 performs an interactive image reproduction using the data of the Video-CD recording area 104 recorded in the optical disk medium 101.

Figures 7, 8:
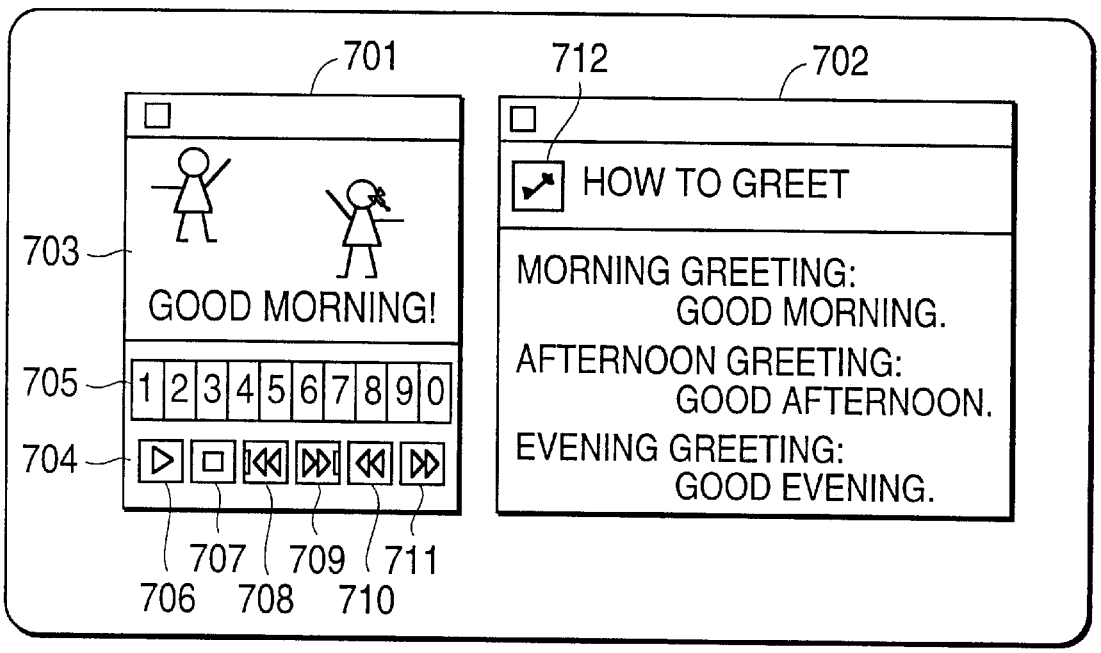
FIG. 7 is a diagram showing an example of output display made by a personal computer in the first embodiment of the present invention.
FIG. 8 is a diagram showing an example of image PC data link table in the first embodiment.

Now, an interactive image reproduction procedure according to the present invention will be described below with reference to FIGS. 7 to 11. More particularly, FIG. 7 shows an example of an output display in the case of reproducing the optical disk medium 101 by the PC 103. This output display, which comprises two display windows of 701 and 702, is generated by the PC application (VIDEOCD.EXE in FIG. 2) recorded in the PC application recording area 106. The display window 701 is an image data display window which, like the Video-CD reproducing system 102, reproduces the image data recorded in the Video-CD recording area, and comprises a reproduced image display section 703 for the display of a reproduced image and an operation panel 704 for generating input codes in response to Video-CD interactive operations made by the user. The operation panel 704 is operated with a mouse or a keyboard of the PC 103. The same panel comprises, for number selection operations of the user, numeric keys 705 for generating input codes corresponding to SELECT1 and SELECT2 of the image reproduction control data, a reproduction key 706 for generating an input code to start (or terminate) the reproduction of image, a return key 707 for generating an input code corresponding to RETURN of the image reproduction control data, a previous key 708 for generating an input code corresponding to PREVIOUS, a next key 709 for generating an input code corresponding to NEXT, a reverse key 710 for generating an input code to rewind the image being reproduced, and a forward key 711 for generating an input code to effect fast forward. The display window 702 is a PC data display window for displaying the text data (e.g. INFOFILE.001 in FIG. 2) recorded in the PC data recording area, and is provided with a keyword display button 712 for displaying the text data on the PC data display window 702.

FIG. 8 shows an example of an image-PC data link table (PCLINK.TB1 in FIG. 2) recorded in the PC data recording area 105. This image-PC data link table is not defined by the above-described, basic Video-CD standard, i.e., such is data newly added to the optical disk medium 101 by the present invention. The link table in question defines, in terms of file names, one or plural text data (recorded in the PC data recording area 105) associated with the image data recorded in the Video-CD recording area 104. In FIG. 8, as to the image data (e.g. MENU.001 in FIG. 2) with respect to menus, a definition of related text data is not made. In the image-PC data link table, a keyword is added to each text data to express the contents of the data. In the same figure, it is shown that the text data associated with the image data VIDEO.001 are INFOFILE.001, INFOFILE.002 and INFOFILE.003 and that the keywords "How to greet," "How to answer" and "How to self-introduce" are added to those text data, respectively.

FIG. 9 shows an example of operations made by the user and corresponding output displays in a case of reproducing the optical disk medium 101 using a PC 103 in accordance with the image reproduction control data illustrated in FIG. 3 and the image-PC data link table of FIG. 8. In FIG. 9, an output display 1 is an example of display of the reproduced image display section 703 of the image data display window 701, while an output display 2 shows an example of display of the PC data display window 702. The operation of the image data display control means 505 in connection with the reproduction of image data, which operation is performed in response to an operation made by the user, is the same as that of the basic Video-CD reproducing system shown in FIG. 4. When the reproduction of the optical disk medium 101 is started by the PC 103, the image data MENU.001 is displayed on the image data display window 701, whereas the PC data display window 702 does not appear on the PC 103 because related text data is not defined in the image data MENU.001. When the user makes key input of SELECT1, the image data VIDEO.001 is displayed on the image data display window 701, and at the same time the PC data display window 702 appears on the PC 103. But at this stage no text data is displayed on the PC data display window 702.

Next, when the user selects a keyword display start button 712 for the PC data display window 702, the keywords of all the text data defined for the image data VIDEO.001 by the image-PC data link table are displayed on the PC data display window 702. In FIG. 9, there are displayed three keywords which are "How to greet," "How to answer" and "How to self-introduce." When the user selects "How to greet" from among those keywords, the keyword list disappears and INFOFILE.001, which is a text file having the keyword "How to greet," is displayed on the PC data display window 702.

Figure 10:
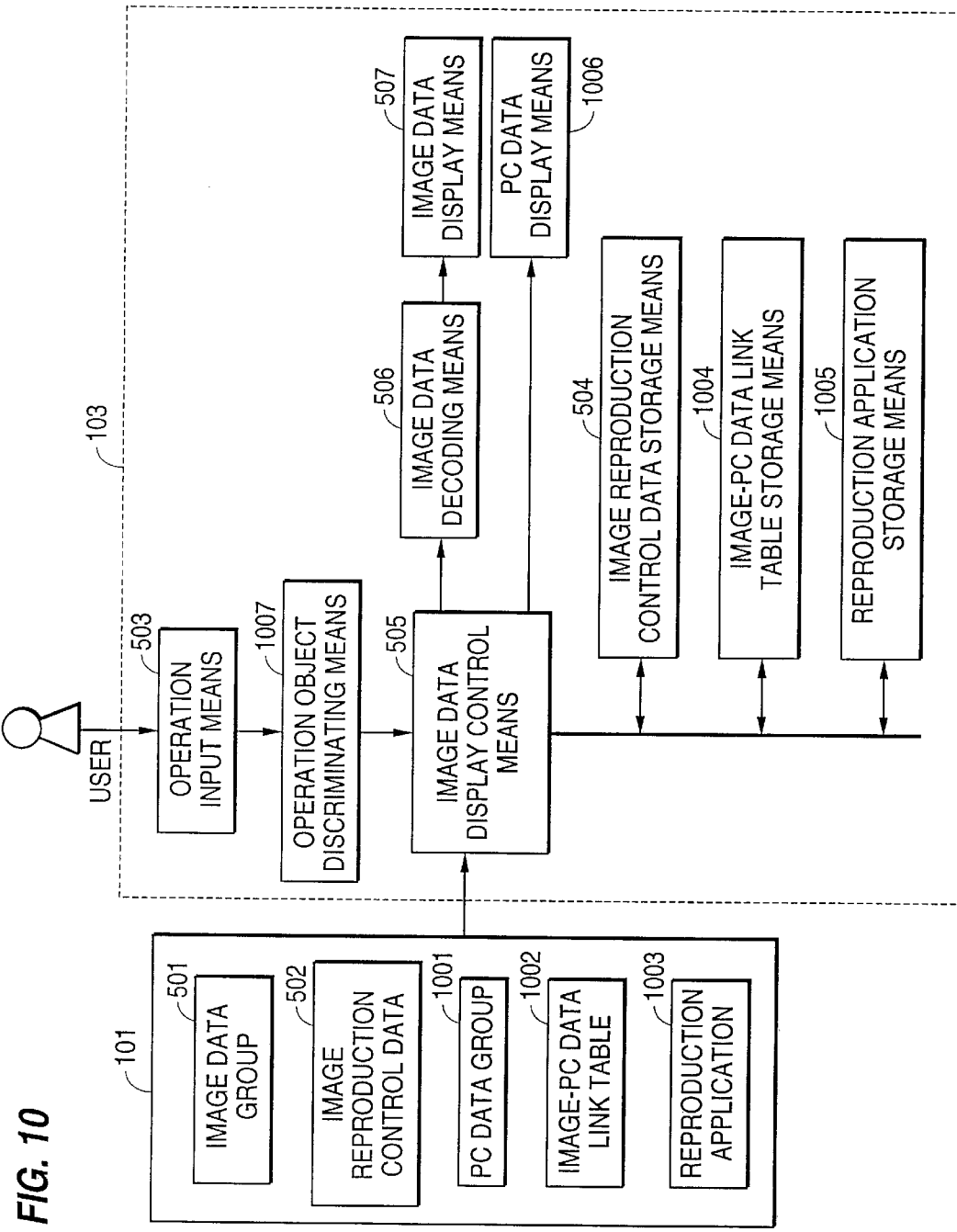
FIG. 10 is a diagram showing a configuration example of an interactive recording/reproducing system in the first embodiment.

The above operations of the PC 103 will be explained below with reference to FIGS. 10 and 11. More particularly, FIG. 10 shows an example of construction of an optical disk medium 101 and a PC 103 for reproducing the same medium. Components similar to those in FIG. 5 are represented by the same reference numerals. In the optical disk medium 101 shown in FIG. 10, an image data group 501 and image reproduction control data 502 are recorded in the Video-CD recording area, while in the PC data recording area 105 are recorded a PC data group 1001, an image-PC data link table 1002 which defines the relation between the image data group 501 and the PC data group 1001, and a reproduction application 1003 for executing the reproduction of the optical disk medium 101 by the PC 103. The PC 103 comprises operation input means 503, image reproduction control data storage means 504, image data display control means 505, image data decoding means 506, image data display means 507, an image-PC data link table storage means 1004 for storing the image-PC data link table 1002, reproduction application storage means 1005 for storing the reproduction application 1003, PC data display means 1006 for displaying PC data, and operation object discriminating means 1007 for discriminating the object of operation inputted by the user. In this example, the operation input means 503 makes the display of a operation panel 704 and a keyword display start button 712, and acquires a user operation input through an input device such as a mouse, a keyboard, a touch panel, and/or an infrared remote controller.

Figure 11:
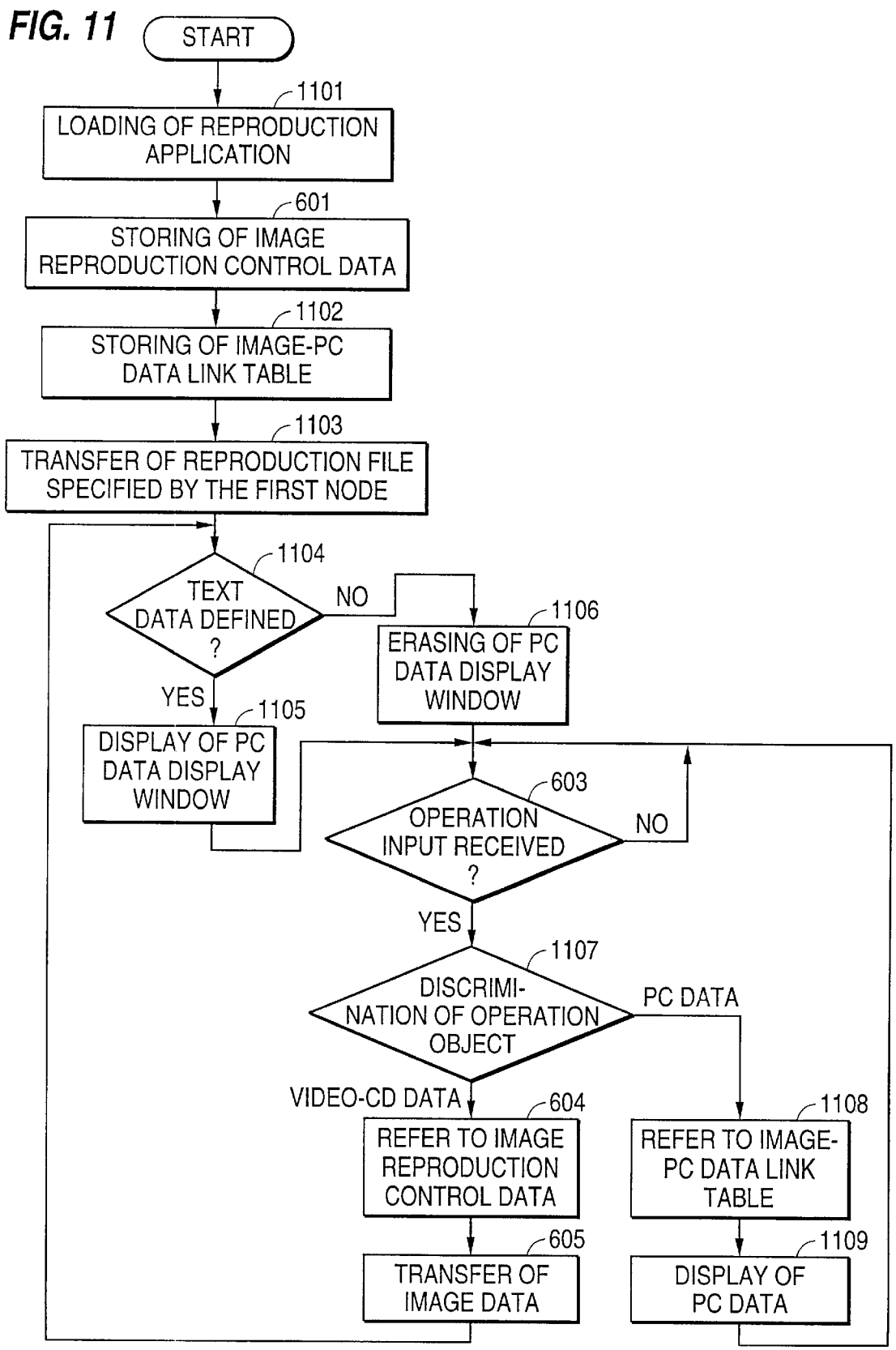
FIG. 11 is a diagram showing a flow of operations of image data display means in the first embodiment.

FIG. 11 comprises the flowchart of the image data display controlling operations shown in FIG. 6 and PC data display controlling operations added to such flowchart. In FIG. 11, any processings similar to those in FIG. 6 are indicated by the same reference numerals. Upon insertion of the optical disk medium 101 into the PC 103, the image data reproduction control means 505 loads the reproduction application (VIDEOCD.EXE in FIG. 2) present in the PC application recording area 106 into the reproduction application storage means 1005 and makes execution thereof (step 1101). The steps which follow are carried out in accordance with this reproduction application. Further, the reproduction control means 505 stores the image reproduction control data 502 (step 601) and stores the image-PC data link table 1002 present in the PC data storage area 105 into the image-PC data link table storage means 1004 (step 1102). The image data reproduction control means 505 transfers image data to the image data decoding means 506, and at the same time, refers to the image-PC data link table 1002 stored in the image-PC data link table storage means 1004 (step 1103). As a result, if there is any defined text data corresponding to the transferred image data (step 1104), the image data display control means 505 displays the PC data display window 702 on the PC 103 (step 1105). In contrast, the image data display control means 505 erases the PC data display window in a case where there is no text data corresponding to the transferred image data (i.e., erases if the Pc data display window 702 was previously displayed on the PC 103) (step 1106).

Upon operation input from the user (step 603), the image data reproduction control means 505 discriminates, through the operation object discriminating means 1007, whether the object of such operation input is the image data display window 701 or the PC data display window 701 (step 1107). In the case where the object is the PC data display window 702, the control means 505 makes reference to the image-PC data link table 1002 (step 1108) and causes the PC data display means 1006 to display keyword or text data (step 1109). The steps 604 and 605 are the same as in FIG. 6, so explanation thereof is not repeated. Subsequently, appropriate operations of steps 1104 to 1109 and 603 to 605 are repeated.

According to this embodiment as set forth above, not only can reproduction of Video-CD image be performed interactively, but also data controlled by a personal computer such as text data (e.g., ASCII coded text) can be recorded in a same optical disk medium in association with a reproduced image. Consequently, the optical disk medium can have commentaries, in textual data form, for images or the like. Hence a smaller data volume is accomplished in comparison to having textual commentaries stored as image data, thus permitting a larger amount of information to be recorded in the optical disk medium. Further, since the data used can be controlled by a personal computer, it is possible to print the data easily using a printer 120 (FIG. 1). Therefore, for example in a case of image material for an educational program such as an English teaching material, by possessing a collection of problems or the like relating to an image it is made possible to learn such image while seeing it, and to confirm the contents thereof with the use of a collection of problems having printed text data. Additionally, since the recording method according to the present invention completely covers the data which the conventional Video-CD reproducing system requires, it is possible to effect reproduction even in a conventional reproducing environment.

Although in this embodiment keywords are first displayed, a desired keyword is selected and the text data corresponding to the selected keyword is displayed, the keyword display may be omitted and the display of text data may be done directly. In this case, the definition of keyword may be omitted from the image-PC data link table.

Figure 12:
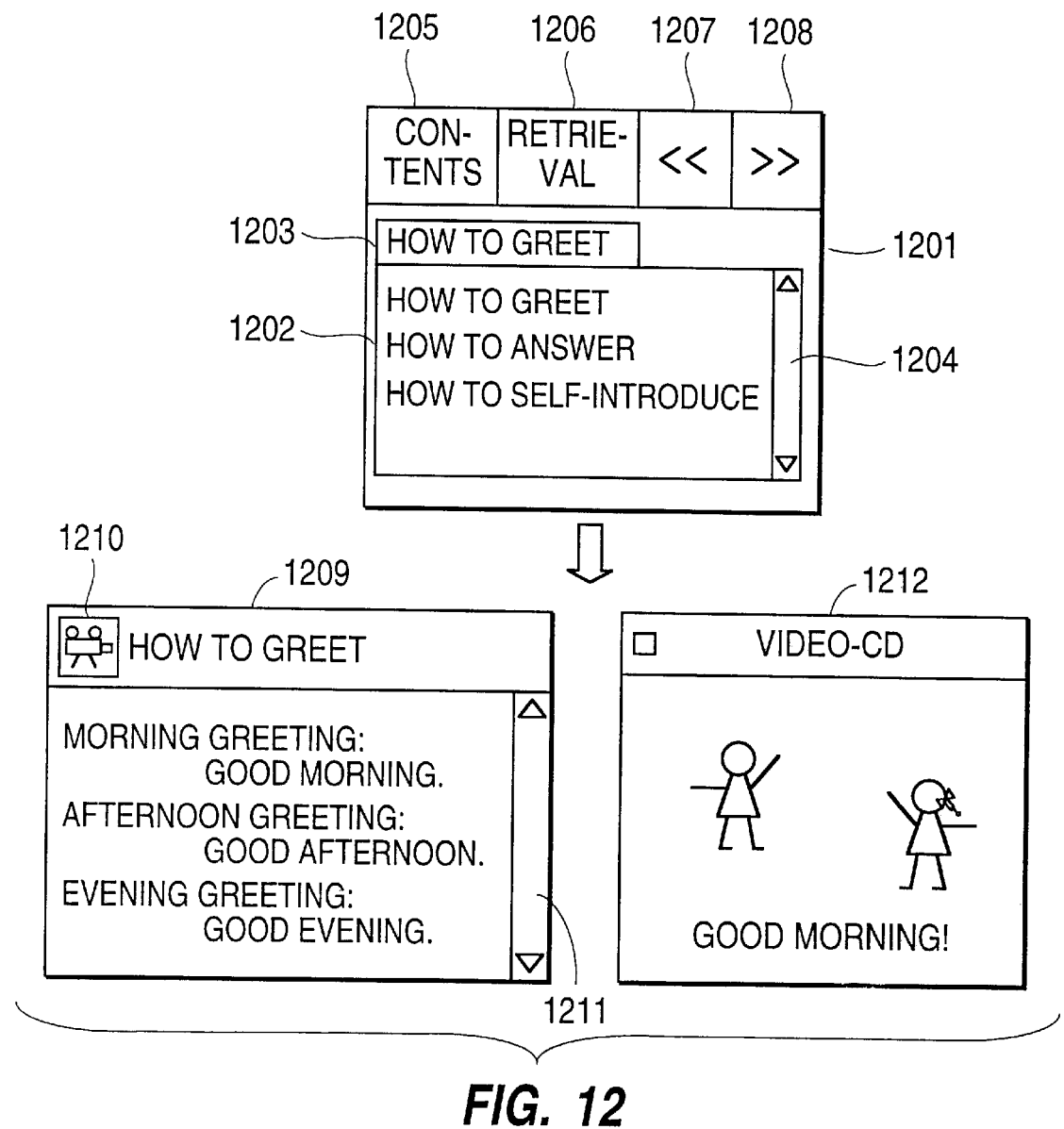
FIG. 12 is a diagram showing an example of output display made by a personal computer in the second embodiment of the present invention.

The following description is now provided about a second embodiment of the present invention. More particularly, FIG. 12 shows a second method for reproducing an optical disk medium 101 having the same data structure as in the above first embodiment, by means of a PC 103. More specifically, upon input of a keyword from the user, the PC 103 searches such inputted keyword from among the keywords included in the image-PC data link table 1002, and displays and reproduces the related image data and PC data. At this time, for example, the display made in the PC 103 is composed of three display windows 1201, 1209 and 1212, as shown in FIG. 12.

In FIG. 12, the numeral 1201 denotes a keyword retrieval window for facilitating a keyword retrieved on the basis of an operation made by the user, numeral 1202 denotes a keyword list display box for displaying a list of keywords recorded in the image-PC data link table 1002, numeral 1203 denotes a selected keyword display box for displaying a keyword selected by the user's operation, numeral 1204 denotes a scroll bar for vertically scrolling the keyword list in accordance with the user's operation, numeral 1205 denotes a button for displaying a table of contents of keyword retrieval by the user's operation, numeral 1206 denotes a retrieval start button for starting the retrieval of keyword by the user's operation, numeral 1207 denotes a button for returning the keyword retrieval display to a display immediately preceding a present display by the user's operation, and numeral 1208 denotes a button for returning the keyword retrieval display to a display immediately following a present display by the user's operation. Further, numeral 1209 denotes a keyword retrieval result display window for the display of PC data after keyword retrieval in accordance with the user's operation, numeral 1210 denotes an image reproduction start button for instructing, upon input from the user, reproduction of an image associated with the PC data displayed on the keyword retrieval result display window 1209, numeral 1211 denotes a scroll bar for vertically scrolling the PC data displayed on the keyword retrieval result display window 1209 in accordance with the user's operation, and numeral 1212 denotes a keyword retrieval image data display window for the display of an image associated with the PC data displayed on the keyword retrieval result display window 1209.

Figure 13:
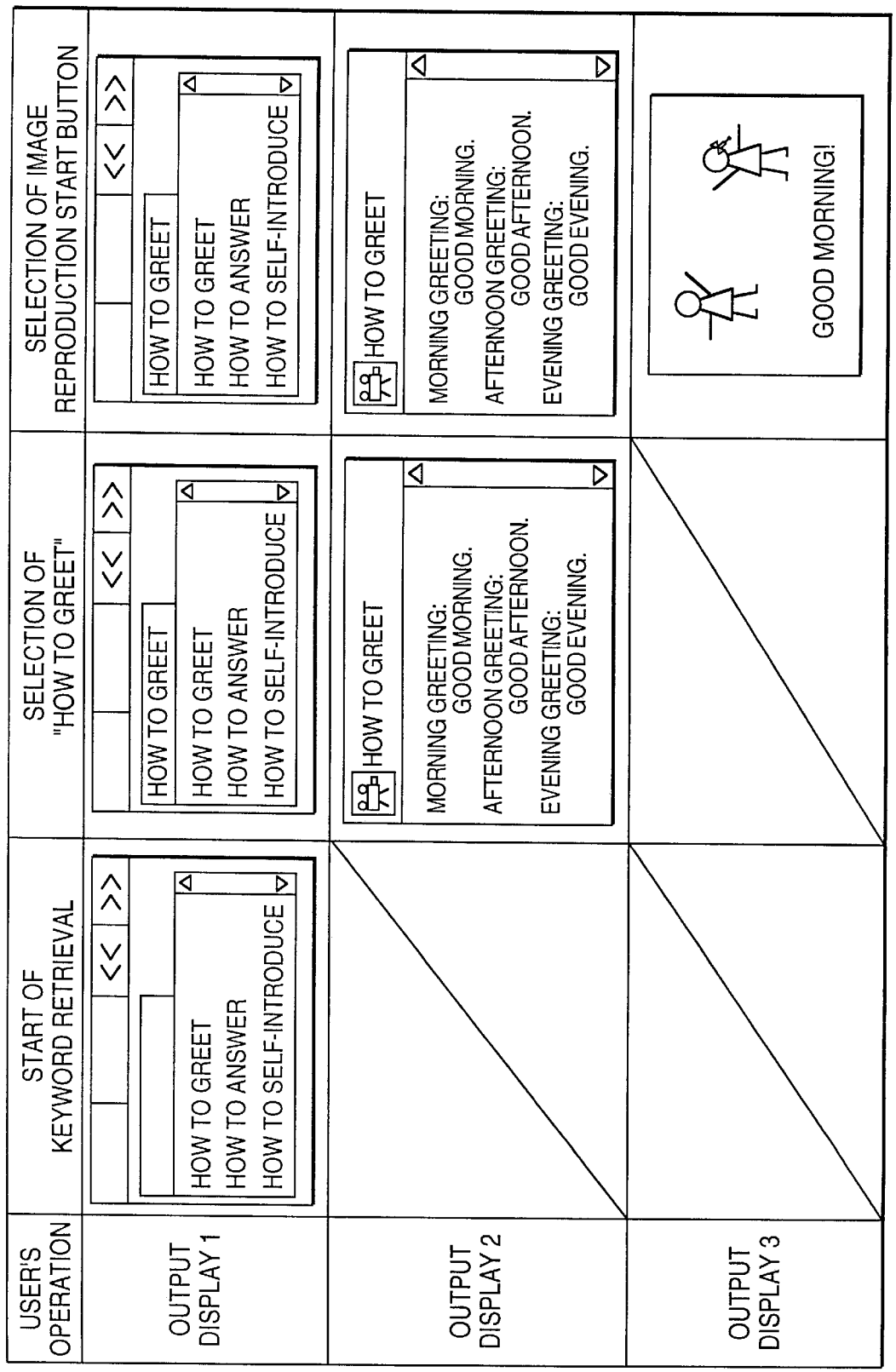
FIG. 13 is a diagram showing an example of operation made by the user and a corresponding output display in the second embodiment.

FIG. 13 shows sequential operations performed by the user and corresponding sequential output displays in the PC 103 in the case of reproducing the optical disk medium 101 by the PC 103 on the basis of a retrieval of a keyword. In the same figure, output displays 1, 2 and 3 show display examples of the keyword retrieval display window 1201, keyword retrieval PC data display window 1209 and keyword retrieval image data display window 1212, respectively.

When a reproduction of the optical disk medium 101 based on keyword retrieval is started, the PC 103 causes the keyword retrieval display window 1201 to display a list of keywords in the keyword list display box 1202. On the basis of the selection of a keyword ("How to greet" in FIG. 13) as inputted by the user, the PC 103 searches and displays appropriate keywords for retrieval, and displays a selected keyword in the selected keyword display box 1203. At this time, upon input (i.e., activation) of the retrieval start button from the user, the PC 103 searches for PC data associated with the acquired keyword from the image-PC data link table 1002 (INFOFILE.001 in FIG. 8), and displays such PC data in the retrieval result display window 1209. Next, upon input (i.e., activation) of the image reproduction start button 1210 from the user, the PC 103 searches for image data associated with the acquired keyword from the image-PC data link table 1002 (VIDEO.001 in FIG. 8) and displays such image data in the keyword retrieval image data display window 1212.

Figure 14:
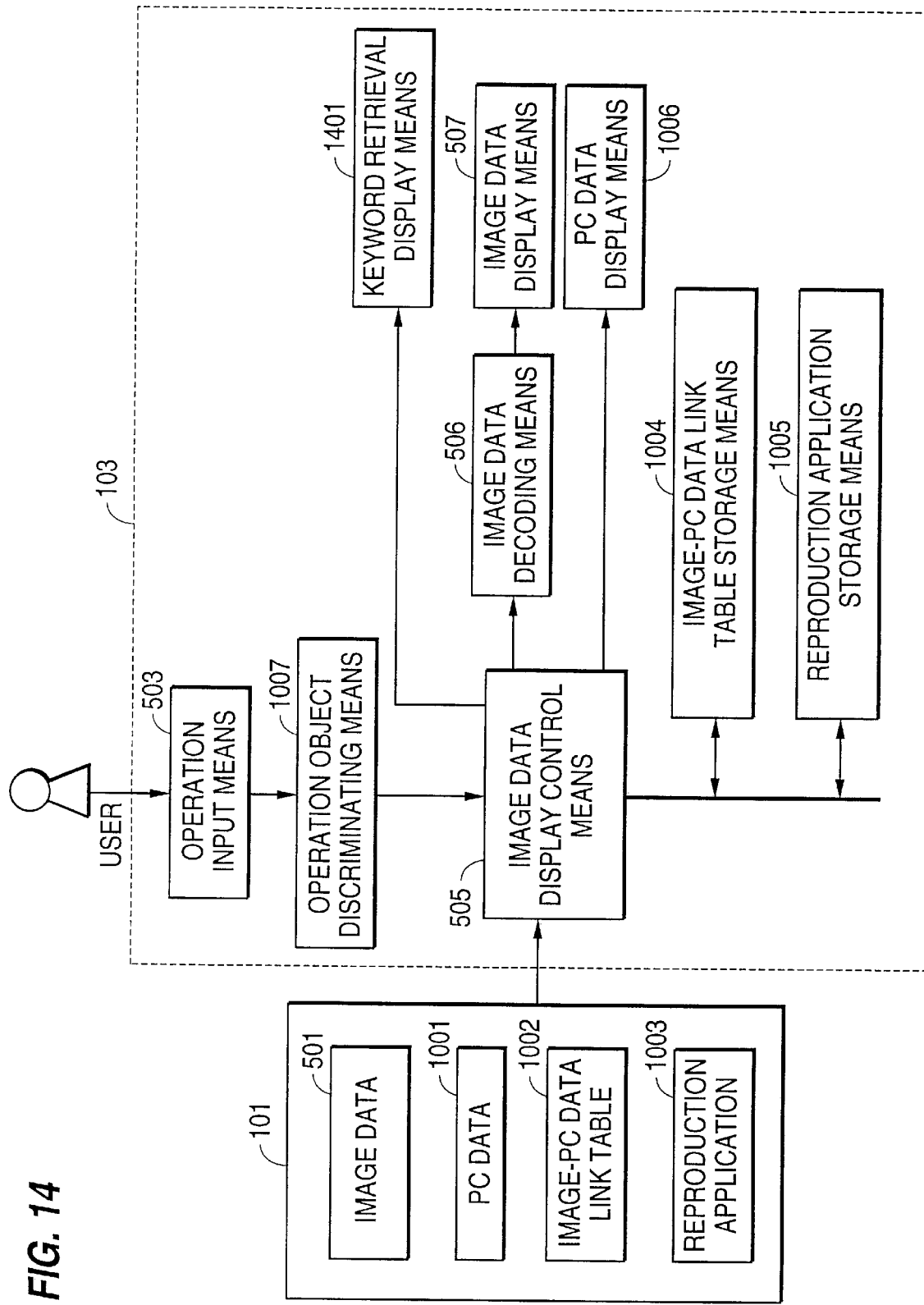
FIG. 14 is a diagram showing a configuration example of an interactive recording/reproducing system in the second embodiment.

The above operations will be explained below with reference to FIGS. 14 and 15. More particularly, FIG. 14 shows a construction example of an interactive image reproducing procedure according to this embodiment, in which the same components as in FIG. 10 are indicated by the same reference numerals. In FIG. 14, the image reproduction control data 502 and the image reproduction control data storage means 504 are not used, but instead, a keyword retrieval display means 1401 is newly added for display of the keyword retrieval display window 1201. At this point, it is useful to note that, while discussion and illustration of the present invention appears to discuss and illustrate multiple display means (e.g., keyword retrieval display means 1401, image at display means 507, and PC data display means 1006 in FIG. 14) as separate, discrete display means, it should be understood that such multiple display means can be provided on separate display apparatus, or, in a preferred embodiment, can be provided in separate "windows" of a single display apparatus.

Figure 15:
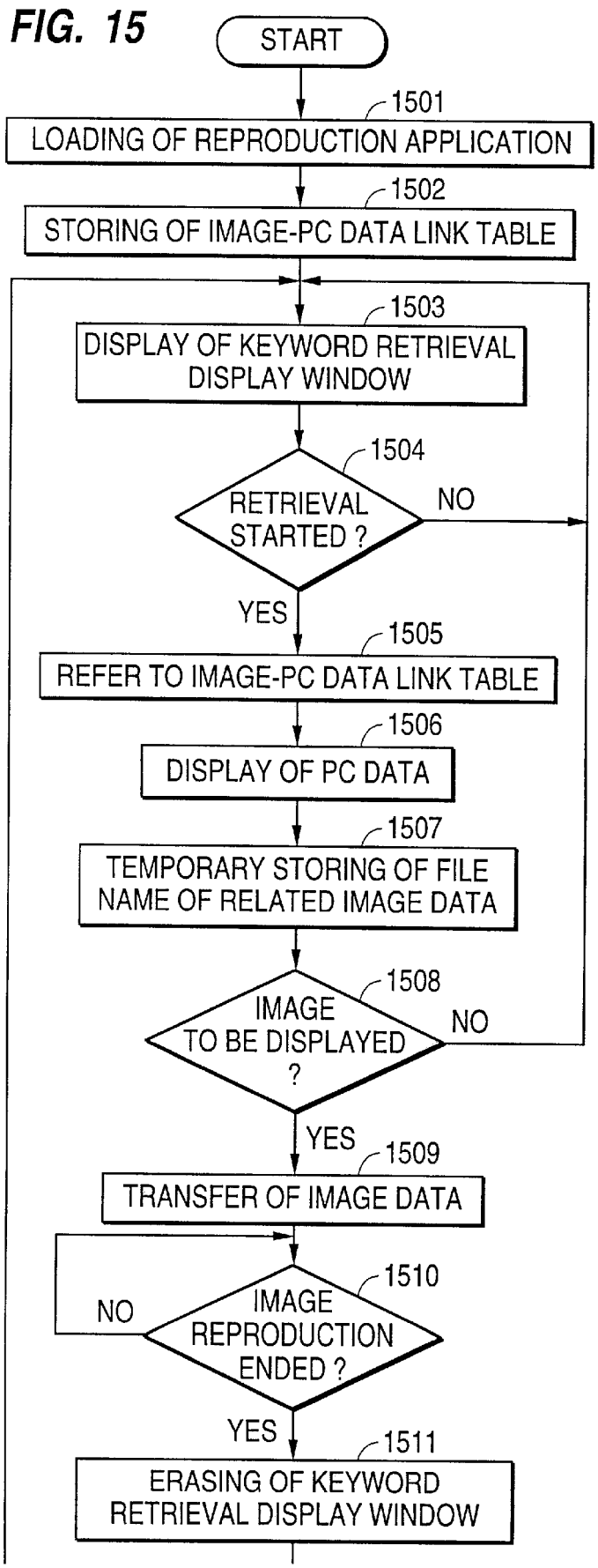
FIG. 15 is a diagram showing the flow of operations of image data display means in the second embodiment.

FIG. 15 is a flowchart showing the flow of operations of the image data display control means 505 after insertion of the optical disk medium 101 into the PC 103. Once the optical disk medium 101 is inserted into the PC 103, the image data display control means 505 loads the reproduction application 1003 in the reproduction application storage means 1005 and makes execution thereof (step 1501). The steps which follow are carried out in accordance with this reproduction application. Next, the image data display control means 505 stores the image-PC data link table 1002 into the image-PC data link table storage means 1004 (step 1502), and causes the keyword retrieval display means 1401 to display the keyword retrieval display window 1201 in the PC 103 (step 1503).

When the user selects a keyword from the keyword list display box 1202 and pushes (i.e., activates) the retrieval start button 1206 (step 1504), the image data display control means 505 searches for the selected keyword from the image PC data link table 1002 stored in the image-PC data link table storage means 1004 (step 1505), and causes the PC data display means 1006 to display the PC data containing that keyword in the keyword retrieval PC data display window 1209 (step 1506). At the same time, the image data display control means 505 temporarily stores the file name of image data associated with the displayed PC data (step 1507).

Next, when the user pushes (i.e., activates) the image reproduction start button (step 1508), the image data display control means 505 reads the image data of the temporarily-stored file name from the image data group 501, and transfers it to the image data decoding means 506 (step 1509). The image data decoding means 506 decodes the image data and transfers the decoded data to the image data display means 507, whereby the decoded image data is displayed in the keyword retrieval image data display window 1212. When reproduction of image data is complete (step 1510), the image data display control means 505 erases the display window 1212 (step 1511) and the display returns to the keyword retrieval display. Subsequently, the operations of steps 1503 to 1511 are repeated. Thus, according to this embodiment it is possible to make access directly to a desired image without going by way of a menu display. Therefore, if the user remembers a keyword of an image previously seen, it is possible to make direct access to the image, even if such image is located in a deep position of the menu hierarchy.

Figure 16:
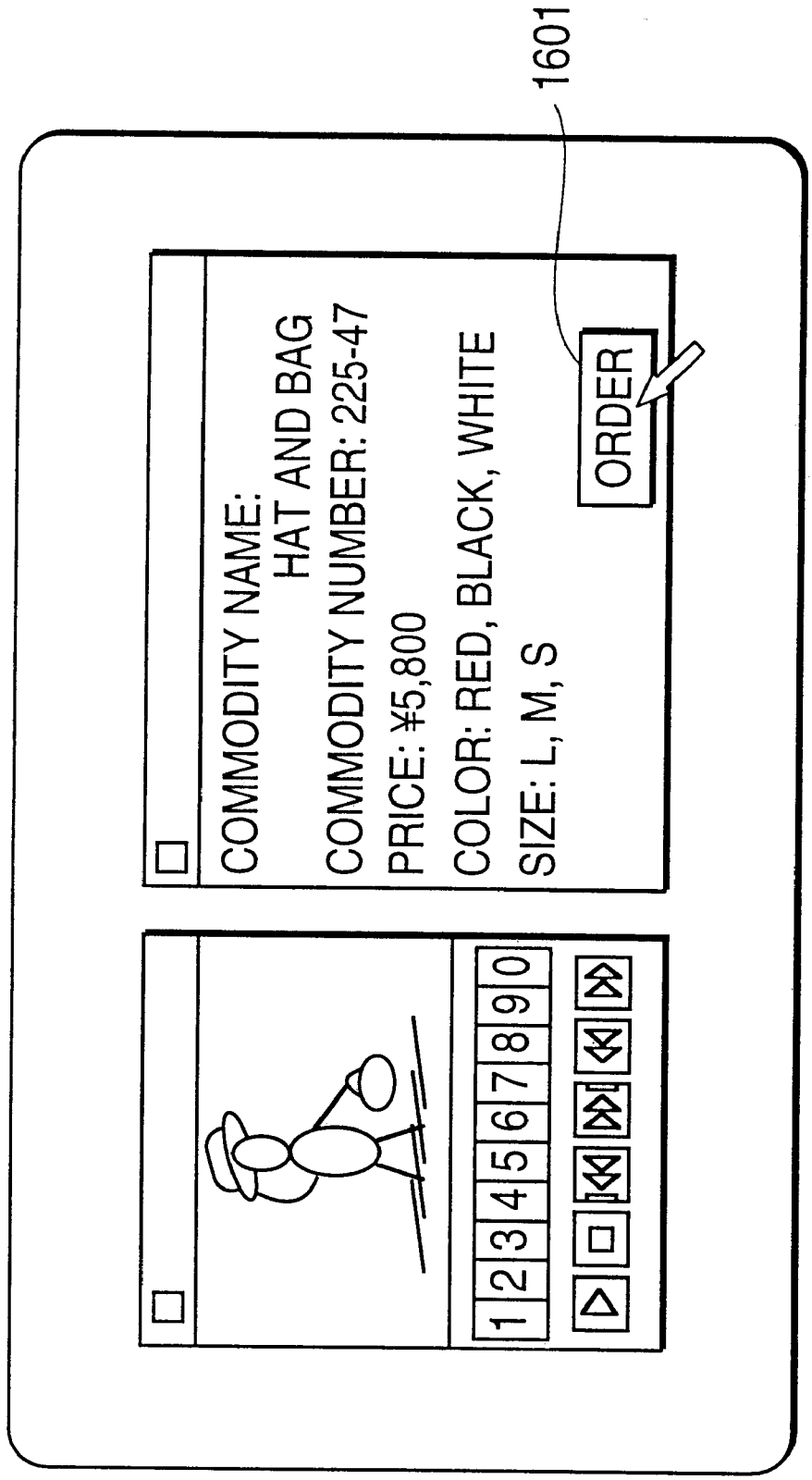
FIG. 16 is a diagram showing an example of output display made by a personal computer in the third embodiment of the present invention.

Reference will be made below to a third embodiment of the present invention. More particularly, FIG. 16 shows an example of a display outputted to the PC 103, in which example the optical disk medium 101 is used as a commodity catalog for the sale of commodities and a content of such optical disk medium 101 is reproduced by the PC 103. The construction of this display is the same as that shown in FIG. 7, with the exception that in the PC data display window 702 the keyword display button 712 is omitted and an order instruction button 1601 is newly provided. In this case, the image data reproduced in the image data display window 701 is a commodity introducing image data, and for text data displayed in the PC data display window 702 there are included commodity catalog data, for example, a name of a commodity being introduced, a commodity number serving as a reference number on an order receiver side, as well such commodity data as a price, color, size and material. Simultaneously with each change-over from one image data (i.e. commodity image for introduction) to another in the image data display window 701, text data displayed by the PC data display means 702 is also changed over to text data corresponding to that image data (e.g., corresponding to a next commodity being introduced). This is automatically done in response to the user's operation.

In this embodiment the PC 103 has a communication function of transmitting and receiving data through a communication line to and from a commodity order reception center. Such commodity order reception center is a distributor of the optical disk medium 101 providing the commodity catalog in optical disk form, and the PC data group 1001 includes an access number (e.g. telephone number) to the commodity order reception center. When the user finds out a desirous commodity while looking at the displayed image and selects the order instruction button 1601, the PC 103 transmits an order information to the commodity order reception center included in the PC data, through the communication line on the basis of the access number.

Figure 17:
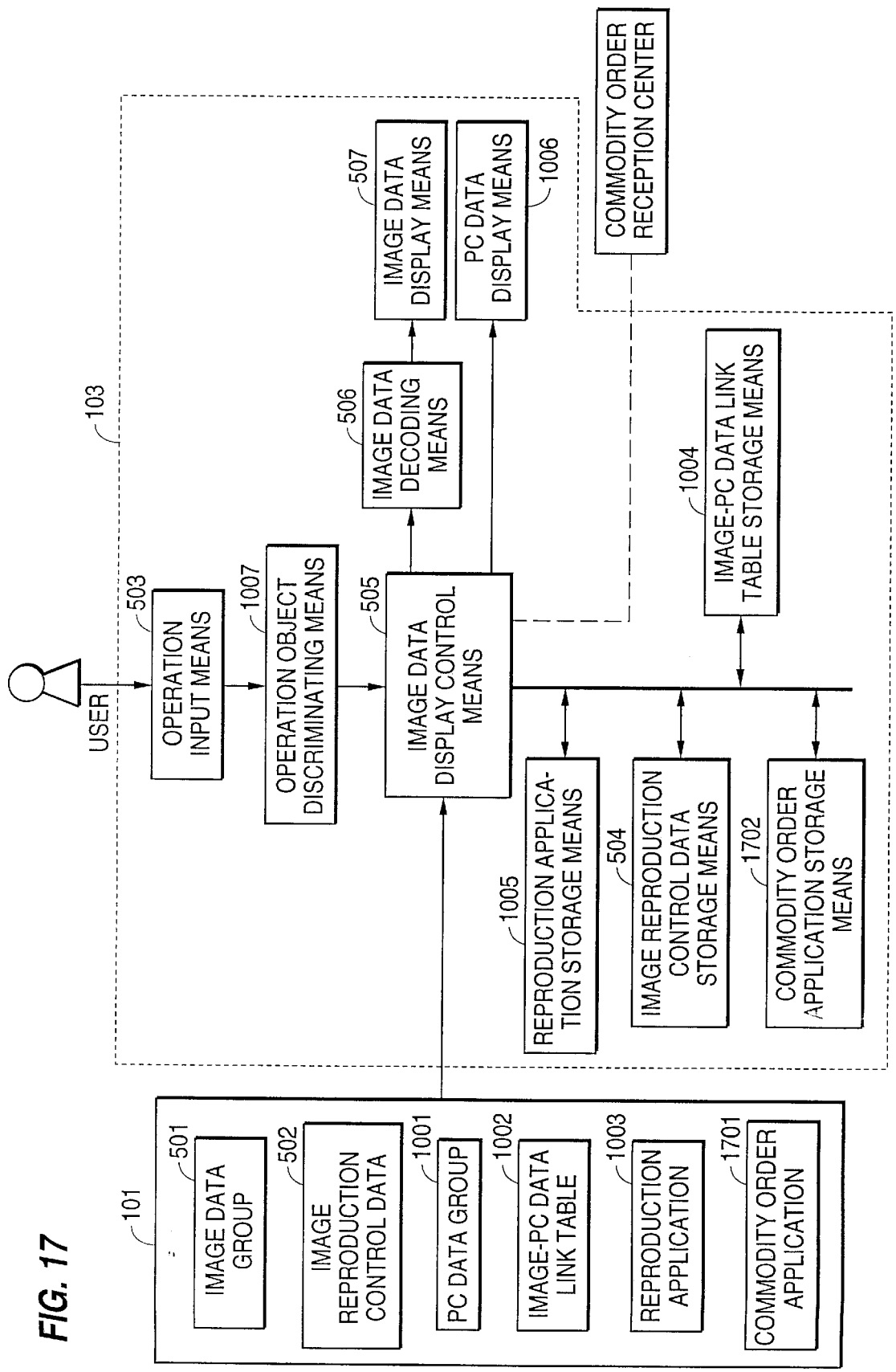
FIG. 17 is a diagram showing a configuration example of an interactive recording/reproducing system in the third embodiment.

The above operations of the PC 103 will be explained below with reference to FIGS. 17 and 18. More particularly, FIG. 17 shows a construction example of an interactive image reproducing procedure according to this embodiment, in which the same components as in FIG. 10 are indicated by the same reference numerals. In FIG. 17, a commodity order application 1701 for the execution of a commodity order is added to the PC data recording area 105 of the optical disk medium 101, and a commodity order application storage means 1702 for the storage of a commodity order application is added to the PC 103. The operations of the PC 103 in connection with image reproduction and the display of text data are the same as in the first embodiment, with the exception that the PC data group 1001 does not have any keyword, and that when PC data associated with the image data reproduced is defined, the PC data is always displayed. Upon input (i.e., activation) of the order instruction button 1601 by the user, the image data display control means 505 loads the commodity order application 1701 into the commodity order application storage means 1702 and makes execution thereof (step 1801). Next, the control means 505 refers to the image-PC data link table 1002 (step 1802), acquires data necessary for the order such as access number (e.g. telephone number) to the order reception side and commodity number from the PC data, and prepares an order information (step 1803). The PC 103 then transmits this order information to an order reception side, namely the commodity order reception center through the communication line (step 1804).

Thus, according to this embodiment, since the user can choose a desirous commodity while seeing an accurate displayed image, the present invention is advantageous in that it is rarely the case that the commodity image differs from the actual commodity (i.e., in comparison with a case where the selection of commodity is made using a paper catalog, magazine, or the like). In addition, since it is possible to effect an interactive reproduction, the user can find out a desirous commodity easily while looking at a menu. Further, since the PC 103 has a communication function, the user can order a commodity with a single button, and thus the operation required is simplified and is effected more quickly in comparison with an order using telephone, FAX, or postcard.

Description will be directed below to a fourth embodiment of the present invention. More particularly, FIG. 19 shows an example of an image reproduction control data management table which defines conditions for the use of image reproduction control data in the PC 103, in a case where the optical disk medium 101 has plural such image reproduction control data (e.g., for multiple users). The image reproduction control data management table is recorded in the PC data recording area 105 of the optical disk medium 101. This management table shows correlations between image reproduction control data and passwords. The plural image reproduction control data shown therein are recorded in the PC data recording area 105. The recorded contents are equal to the image reproduction procedure defined by the basic Video-CD standard. It is optional whether the data in question are to be recorded in just the same image reproduction control data recording format as that defined by the Video-CD standard or in a different recording format.

In FIG. 19, passwords are defined as conditions for use of respective image reproduction control data. Upon input of a password from the user, the image data display control means 505 refers to the image reproduction control data management table shown in FIG. 19, acquires the name of the image reproduction control data corresponding to the password, reads the corresponding image reproduction control data from the PC data recording area 105 of the optical disk medium 101, and stores it into the image reproduction control data storage means 504. Although in this embodiment a password input by the user is used as a condition for using the image reproduction control data, other conditions such as date and time or the like, may be used as additional or replacement conditions. In this case, a means for checking the date and time is provided within the PC 103, and only image reproduction control data corresponding to the date and time indicated by the said means is allowed to be used.

Figure 20:
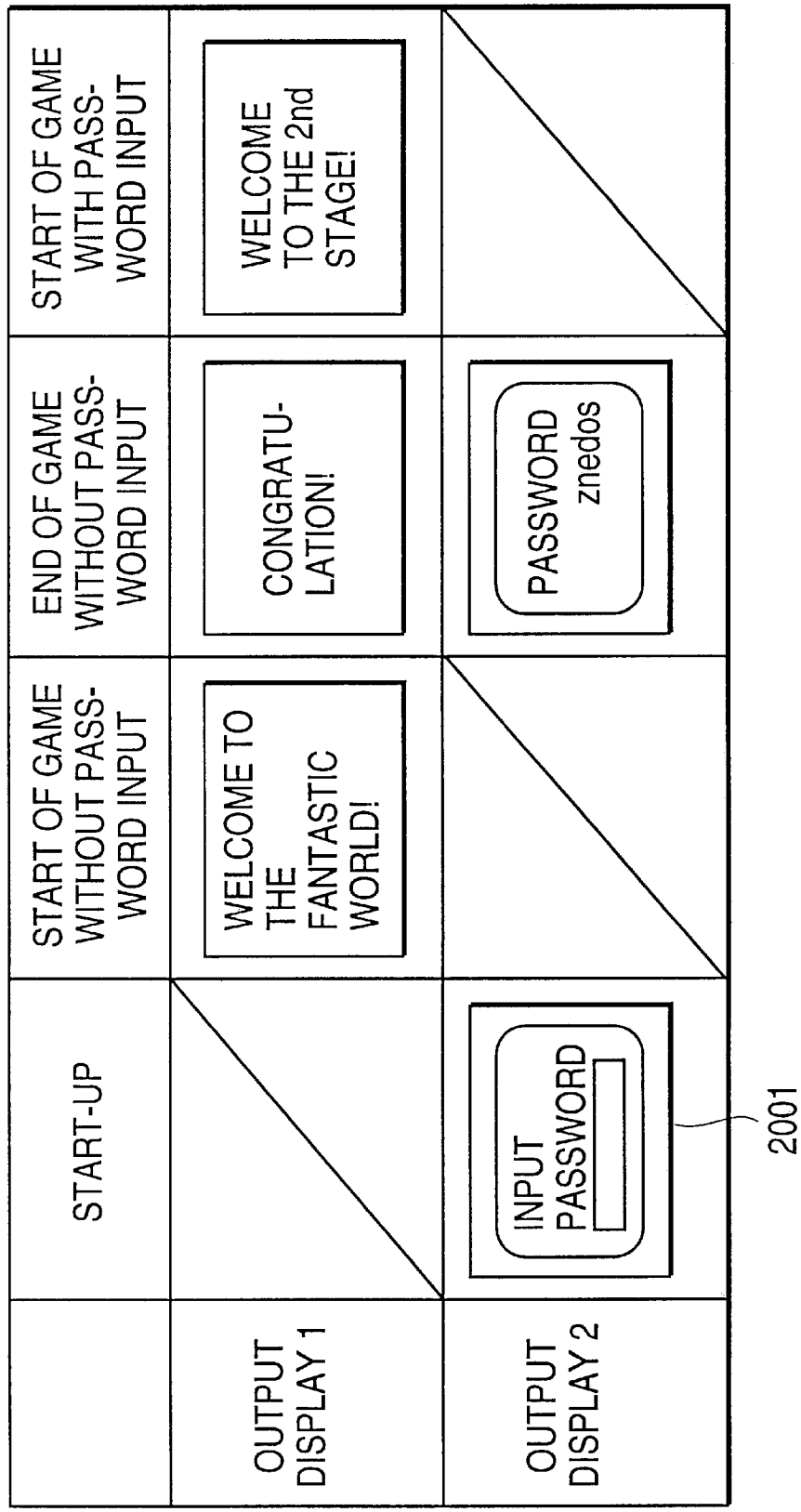
FIG. 20 is a diagram showing a relation between image data reproduced and PC data displayed in the fourth embodiment.

FIG. 20 shows an example of a display reproduced and outputted by the PC 103 in the case of using the optical disk medium 101 as a game application. The display configuration in the PC 103 is the same as in FIG. 7, with the exception that the keyword display start button 712 is not provided in the PC data display window 702. Output displays 1 and 2 show display examples of image data display window 701 and PC data display window 702, respectively. The PC 103, upon receipt of the optical disk medium 101, makes a display in the PC data display window 702 which display 2001 requests the user to make a password input. For example, this password is such that several levels are set for a game and that when the user has reached a preset level, a next password is shown as an output display to the user. The password in question is included in the PC data group 1001 and is defined in association with the display image at the end of each game level by the image-PC data link table. The PC 103 reproduces the image data defining the password and at the same time displays the password in the PC data display window 702. Upon completion of the reproduction of the image data defining the password, the PC 103 erases the display of the password. When there is no password input from the user, or when an inputted password input is not defined by the image-PC data link table, or when reproduction is made by the Video-CD reproducing system 102, the PC 103 (or the Video-CD reproducing system 102) starts reproduction from a game start point (opening) which is at the lowest level. In contrast, when there is a correct password input from the user, the PC 103 starts reproduction from the start point of the game level at which that password is defined. In the former case, since no corresponding data is present in the image reproduction data management table, the image data display control means 505 starts reproduction in accordance with the image reproduction data recorded in the Video-CD recording area 104. In the latter case, the control means 505 locates the corresponding image reproduction control data from the image reproduction control data management table and starts reproduction in accordance with the control data thus found out. The image reproduction control data defined by the password recorded in the PC data recording area 105 newly defines image data not defined in the image reproduction control data recorded in the Video-CD recording area 104. Every time a certain level is attained, the number of reproduced image data increases. Also, as to the control of reproduction made in response to the user's operation, the control range is extended and set, for example, the number of items capable of being selected is increased.

Figure 21:
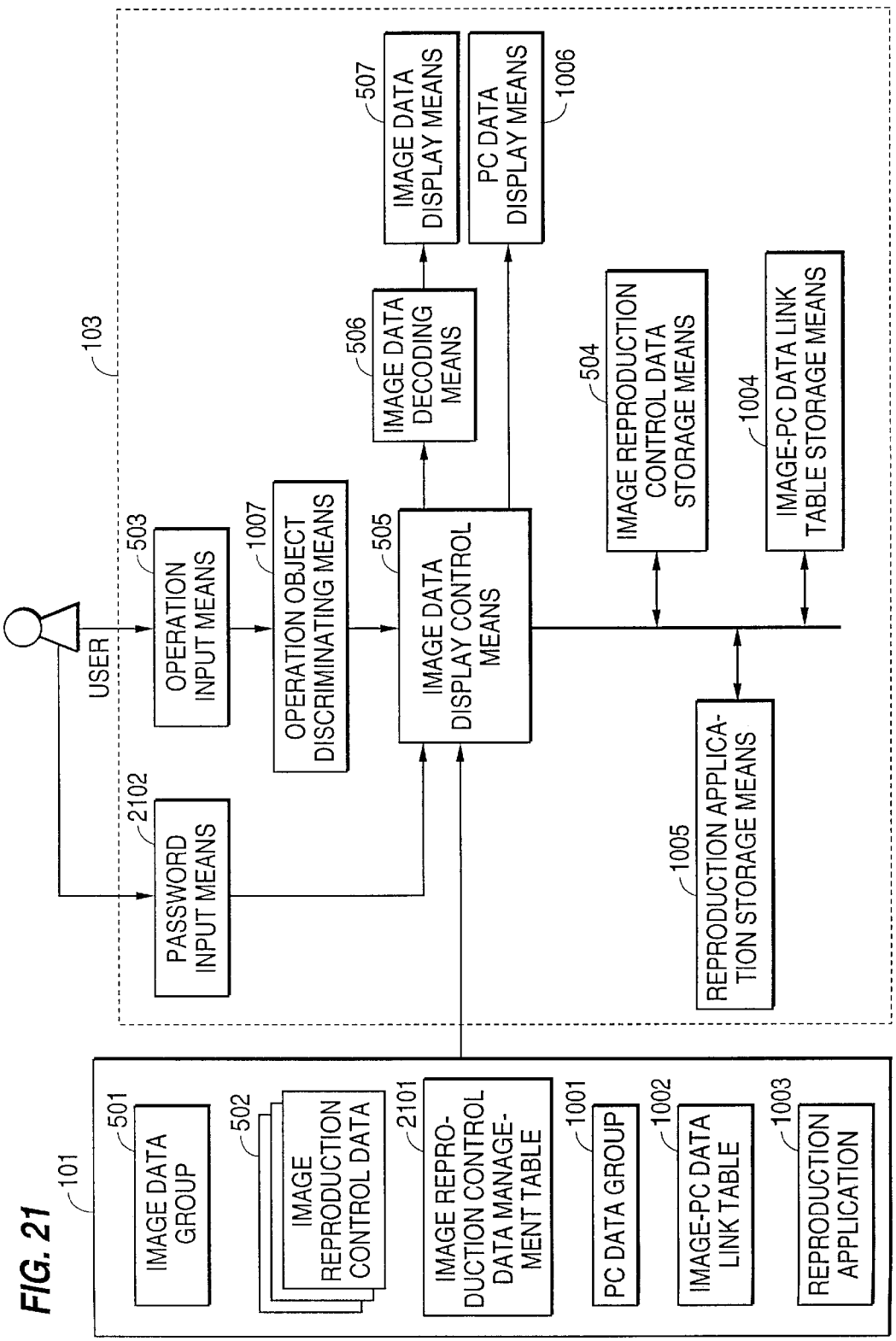
FIG. 21 is a diagram showing a configuration example of an interactive recording/reproducing system in the fourth embodiment.

The above operations of the PC 103 will be explained below with reference FIGS. 21 and 22. More particularly, FIG. 21 shows a construction example of an interactive image reproducing procedure according to this embodiment, in which the same components as in FIG. 10 are indicated by the same reference numerals as in FIG. 10. In FIG. 21, an image reproduction control data management table 2101 which defines conditions for use of the image reproduction control data is added to the PC data recording area 105 of the optical disk medium 101, and password input means 2102 for receiving a password input from the user is added to the PC 103.

Figure 22:
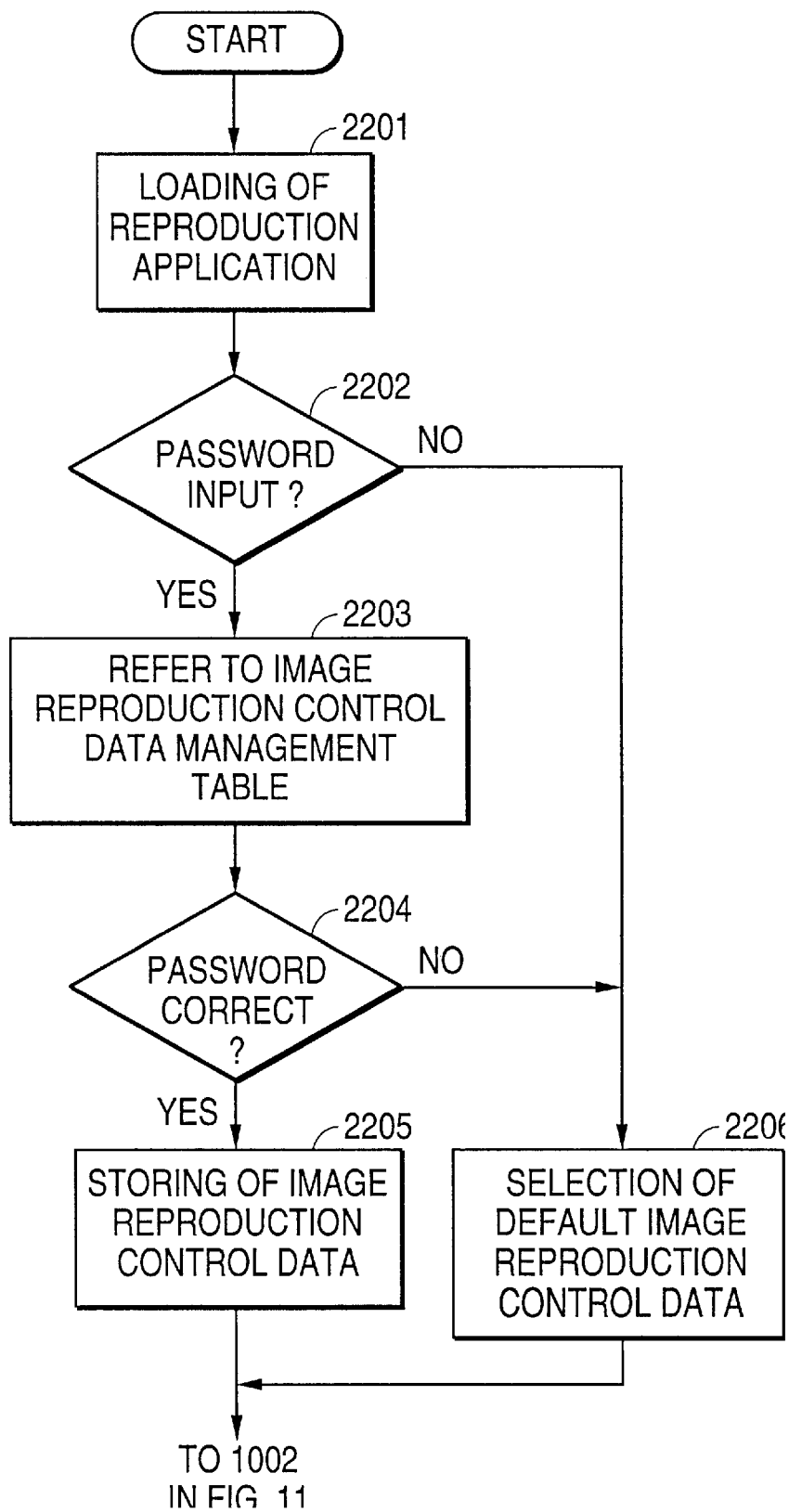
FIG. 22 is a diagram showing the flow of operations of image data display means in the fourth embodiment.

FIG. 22 is a flowchart showing the flow of operations of the image data display control means 505 after insertion of the optical disk medium 101 into the PC 103 until the start of reproduction. More particularly, when the PC 103 receives the optical disk medium 101, the image data display control means 505 executes the reproduction application 1003 (step 2201) and makes a display in the PC 103 requesting the user to input a password (step 2202). Next, upon receipt of a password input from the user, the control means 505 refers to the image reproduction control data management table 2101 (step 2203), and if the received password is one defined in the management table 2101 (step 2204), the control means 505 stores the image reproduction control data 502 corresponding to that password into the image reproduction control data storage means 504 (step 2205). When the received password is one not defined by the management table 2101, that is, when an erroneous password has been input (step 2204), or when there is no password input (step 2202), the control means 505 stores the image reproduction control data recorded in the Video-CD recording area 104 into the image reproduction control data storage means 504 (step 2206). Subsequent operations are the same as the operations of steps 1102 et seq. in FIG. 11.

Although in the above description of this embodiment the optical disk medium 101 is used as a game application, the same optical disk medium may be used, for example, as an education application for course learning. In this case, it is possible to let a higher grade of problems appear upon attainment of certain marks as a result of having solved the problems recorded in the optical disk medium 101. It is also possible to first make a display urging the user to select a course (not a password input) in the PC 103, and change the reproduction control method on the basis of the user's desire.

Further, one image may be divided into a number of components, and image data arranged in a random order may be recorded in the Video-CD recording area 104, and reproduced in a correct order by any one of the image reproduction control data 502.

Figure 23:
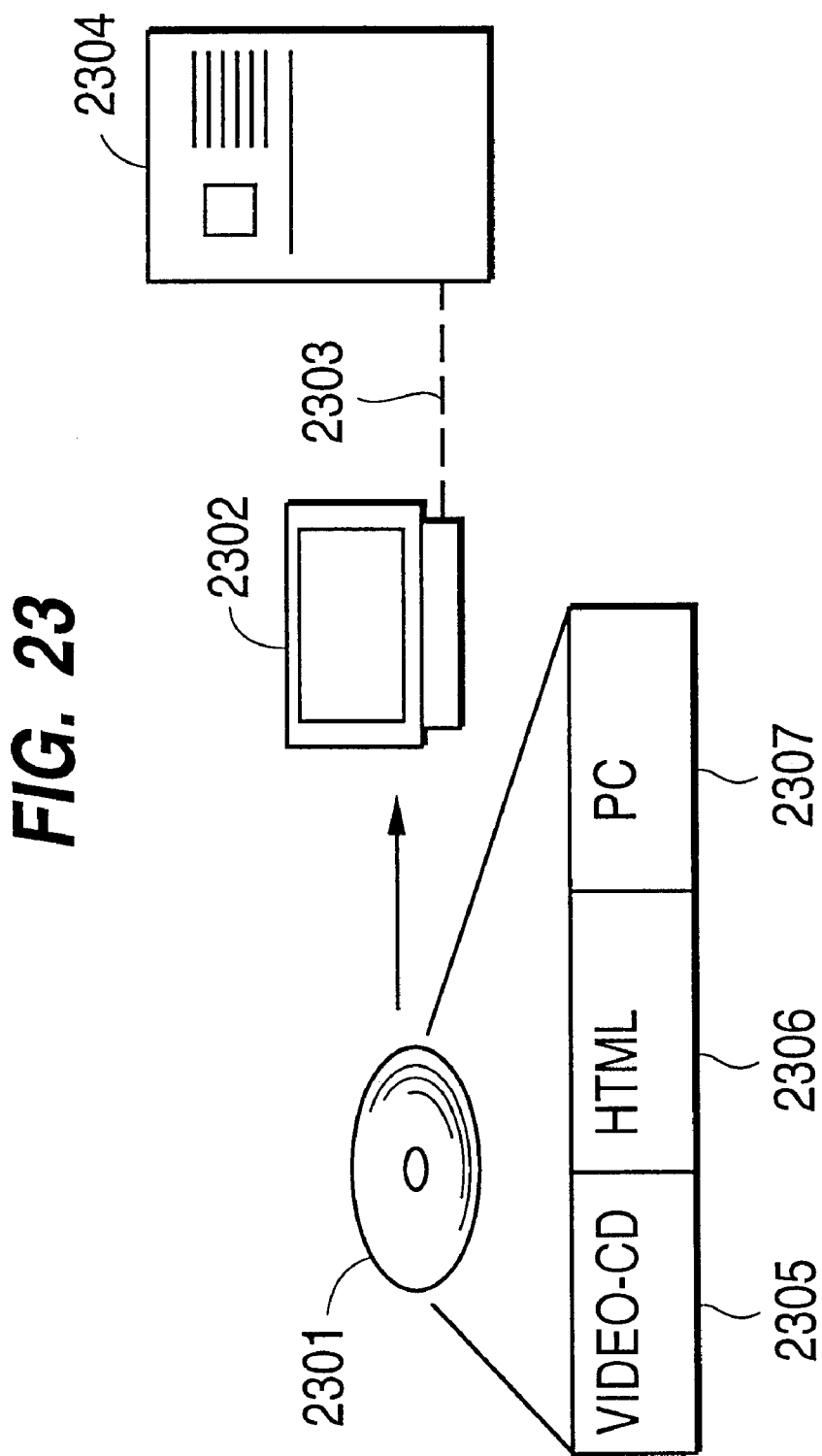
FIG. 23 is a diagram showing the construction of an interactive recording/reproducing system embodying the present invention.

FIG. 23 shows a configuration example of an interactive image recording/reproducing system to which the present invention is applied. More particularly, in FIG. 23, a CD-ROM is used as an interactive image recording medium 2301 and is configured to include a Video-CD data recording area 2305, an HTML data recording area 2306 and a PC data recording area 2307. Interactive image reproducing means 2302 reproduces data to the user from the interactive image recording medium 2301. For example, there is used a personal computer equipped with a CD-ROM reproducing function, MPEG data reproducing function, reproduction control executing function conforming to a basic Video-CD standard, communication function, WWW browser function for controlling reproduction by interrupting a file of HTML format. Interactive image transmitting means 2304 communicates with the interactive image reproducing means 2302 through communication means 2303 (e.g., cable, modem, etc.), and returns appropriate HTML data in response to the URL required by the interactive image reproducing means 2302. This interactive image transmitting means 2304 is called generally a WWW server. At this time, the communication means 2303 may be a medium using a telephone line and PPP protocol in combination, a medium using Ethernet and TCP/IP protocol in combination, or another medium using another system, provided that the medium is capable of transmitting the URL and the HTML data.

Figure 24:
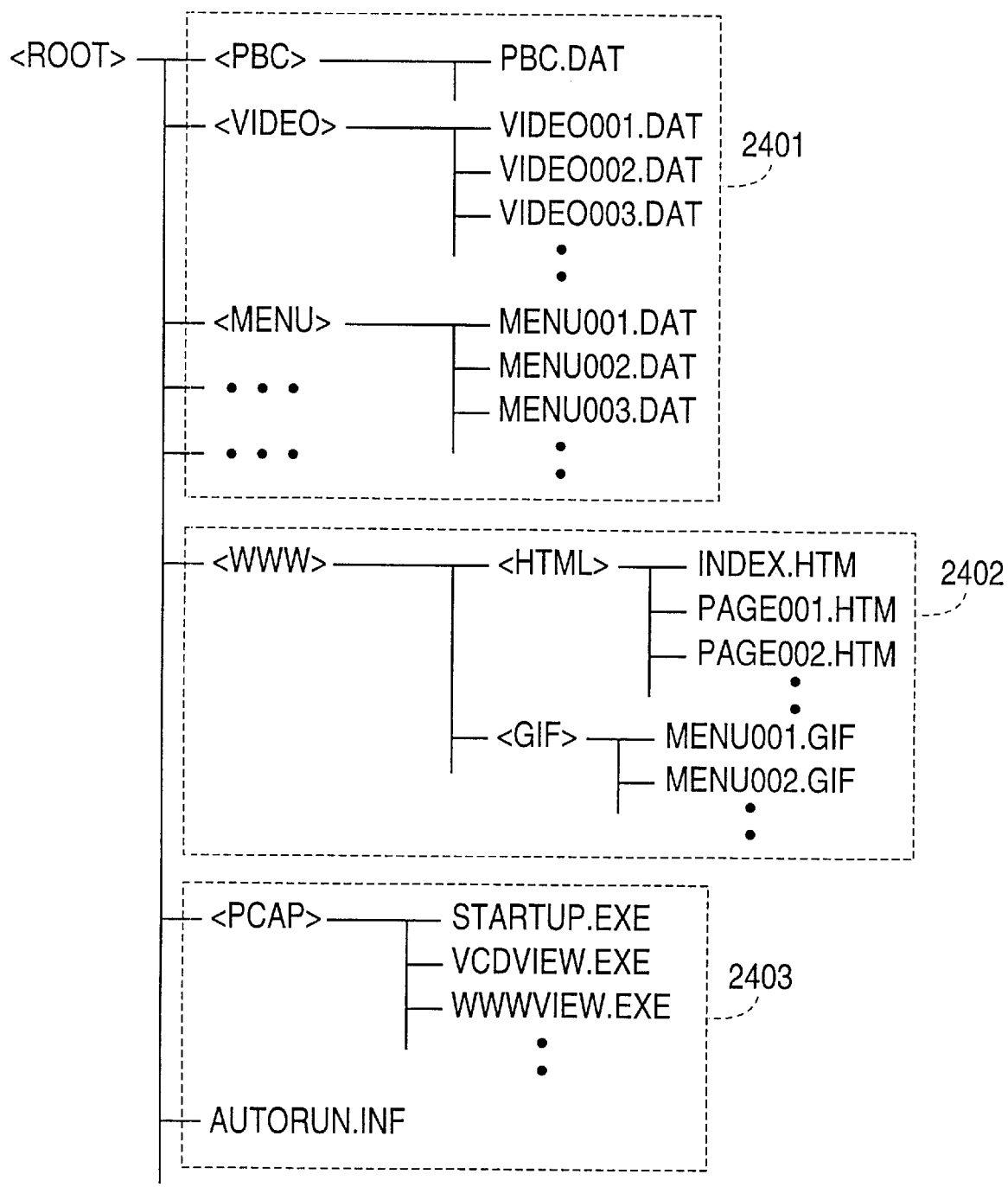
FIG. 24 is a diagram showing an example of a directory structure of an optical disk medium embodying the present invention.

Description will be directed below to a concrete interactive image recording/reproducing system. More particularly, FIG. 24 shows an example of a file structure in the interactive image recording/reproducing medium 2301 in a form of a hierarchy directory. In the drawing, according to the directory structure, recording is made taking into consideration the ISO 9660 standard. In the tree structure, for an identifier of each node portion, a directory name is bracketed (<,>), while a file name is shown without brackets. For example, <ROOT> indicates a root directory which includes some subdirectories, and PBC.DAT stands for a single certain file. The Video-CD data recording area 2305, the WWW data recording area 2306 and the PC data recording area 2307 shown in FIG. 23 correspond to areas 2401, 2402 and 2403, respectively, which are enclosed with dotted lines in FIG. 24.

The structure of a directory and a file recorded in the Video-CD data recording area 2305 is defined by a basic Video-CD standard, which standard defines that necessary files should be recorded taking into consideration the ISO 9660 standard. The structure in question comprises a directory (<VIDEO> in the figure) for recording MPEG image data (e.g. VIDEO001.DAT and VIDEO002.DAT in the same figure), a directory (<MENU>) for recording MPEG image data (e.g. MENU001.DAT and MENU002.DAT) used in such an application as a menu, and a directory (<PBC>) for recording the image reproduction control data (PBC.DAT) describing a file reproduction procedure. The file names and directory names depicted in the figure are not the same as those defined by the basic Video-CD standard. They are names simply used for convenience. Further, they do not show all of the files defined by the same standard.

On the other hand, the WWW data recording area 2306 is an area newly added in the present invention, and is provided in a directory named <WWW>. The WWW data recording area 2306 includes a directory (<HTML> in FIG. 24) for recording text files (INDEX.HTM, PAGE001.HTM and PAGE002.HTM) which are described in HTML format, and a directory (<GIF>) for recording image data (MENU001.GIF and MENU002.GIF) referred to by the file of HTML format. The contents of the files of HTML format recorded in the directory <MHTML> includes character data related to the image data recorded in the Video-CD recording area 2305, image file names for displaying the image data stored in the directory <GIF> and link data for data to be represented to the user when the user makes a menu selection or the like. Further, the file recorded in the directory <GIF> may be image data format capable of being displayed by the WWW browser.

The PC data recording area 2307 is an area newly added in the present invention and is constituted by a directory designated <PCAP> and a file AUTORUN.INF directory recorded in the root directory. In this area, programs necessary for reproducing the interactive image recording medium 2301 of the present invention by the personal computer, and program starting procedures are both recorded.

Description will be directed below to the procedure for reproducing the interactive image reproducing medium 2301 of the present invention using a basic Video-CD reproducing system with reference to FIGS. 25a–b. More particularly, FIGS. 25a–b show an example of a portion of the image reproduction control data (PBC.DAT in FIG. 24). The described contents of the image reproduction control data are defined by the Video-CD standard. This standard prescribes a reproduction procedure describing unit for image data (one or plural) corresponding to user operations or various events. In the present invention, the reproduction unit is expressed as a node. The image reproduction control data comprises plural nodes having independent node numbers, and describes a reproduction procedure for each node.

More specifically, FIGS. 25a and 25b are examples showing reproduction procedures for node numbers 1 to 4 on the assumption that titles are prepared for cooking ethnic dishes. FIG. 25a first displays the image data (MENU001.DAT) of the node number 1 as a display window 2501. The display requests the user to select the node number 1, 2 or 3. The contents in response to the user's operation is described in the node number 1 in FIG. 25b. For example, in the case where the user selects the node number 1 (KEY 1) in reproducing the image data MENU001.DAT of the node number 1, link destination is shifted to the node number 2. When the user selects RETURN, the link destination is not defined, that is, no response occurs.

When the user selects the node 1 while displaying the display window 2501, shift is made to the node 2 and the image data VIDEO001.DAT is reproduced in the display window 2502. According to the description of the node 2 in FIG. 25b, when the user selects RETURN, shift is made to the node number 1 (display window 2501) again.

As described above, the interactive image recording/reproducing medium 2301 is reproduced with the conventional Video-CD reproducing system using the data recorded in the Video-CD recording area 2305, thereby implementing an interactive image reproducing operation. Although the file to be reproduced is designated in terms of file name in the figure, a system may be adopted for directory describing a file address if the system can specify the file.

FIG. 26 shows a reproduction procedure of the interactive image recording medium 2301 of the present invention with the WWW browser. More particularly, a display window 2601 is in a state that the WWW browser opens the file INDEX.HTM recorded in the directory <HTML> in the directory <WWW>. The display window includes an area for displaying a function button 2605 operating page-turning of the browser, an area for displaying the HTML data and a scroll bar 2606 for scrolling operation of the window in the case that the volume of the HTML data is large. The contents of INDEX.HTM conforms to the HTML standard and an example thereof will be described with reference to FIG. 27a. According to the HTML format, the image data is displayed by designating the file name by the portion ". . . " of <IMG SRC=". . . ">. When the image is selected by the user and shift is to be made to any page, <IMG SRC=". . . ">is sandwiched between <A HREF=". . . ">and </A>, and the page name to be shifted to is designated by the portion ". . . " of <A HREF=". . . ">. In FIG. 27a the file INDEX.HTM is opened, the image file MENU001.GIF is displayed and then the image file KEY1.GIF is displayed.

As is apparent from comparison between the display window 2601 of FIG. 26 and the display window 2501 of FIG. 25a, the image data MENU001.GIF has the same image pattern as that of MENU001.DAT. In the display window 2601, there are displayed selection buttons 2607 to which numbers [1], [2] and [3] are allocated for receiving user's selection operations respectively, and in addition, the MENU001.GIF. KEY1.GIF and KEY2.GIF are used for the display data for the selection buttons 2607 (the recording areas for KEY.1GIF and KEY.2GIF are not illustrated in the figure, but is assumed to be in the <GIF> of the WWW data recording area 2306).

In the display window 2601, when the user selects the selection button 2607 [1], shift is made to the corresponding page PAGE001.HTM file as illustrated in display window 2602. The contents of PAGE001.HTM is as shown in FIG. 27b. The file name of the image data to be displayed at the beginning is VIDEO001.GIF. Further, definition has been made for subsequently displaying how to cook "Ethnic Curry" as character data. Moreover definition has been made for finally displaying the selection button linked to the file INDEX.HTM (in the figure the image data of the name RETURN.GIF is allocated.). Again, when the WWW browser opens the file PAGE001.HTM of HTML format, the display window 2602 appears. As apparent from comparison between the display window 2602 of FIG. 26 and the display window 2502 of FIG. 25a, the image data VIDEO001.GIF has the same pattern as that of VIDEO001.DAT.

On the other hand, in the display window 2601, when the user selects the selection button [3], shift is made to the corresponding page PAGE003.HTM file. The contents of PAGE003.HTM is as shown in FIG. 28a. In the page, there are displayed the image data MENU002.GIF, the image data for the selection buttons RETURN.GIF and NEXT.GIF, and character data "Order: $200", and these data constitute the display window 2603. In PAGE003.HTM of FIG. 28a, a URL address is defined as a page shifted to on selection of the character 2608 "Order: $200" by the user. In the same figure, access is made for the WWW server of the name www.ethnic.xxx.xxx using HTTP protocol, and definition is made to open the file order1.htm of HTML format stored in the server.

In the display window 2603, when the user selects "Order: $200" shift is made to the corresponding page order1.htm file. The contents of order1.htm is as shown in FIG. 28b. The contents to be displayed at the beginning is displayed with an underline, that is, characters "Order for spices" sandwiched between <U> and </U>. Subsequently, the image file SPICE1.GIF and characters "Cumin" are displayed in accordance with the description of line 2702. In the description of line 2703, the form input function of HTML is made to be used. This means that when the user selects the description <INPUT TYPE="submit". . . > of line 2705, the WWW browser transfers the form input contents to the program post-query of www.ethnic.xxx.xxx which is the WWW server. As for the form input contents, the text field <INPUT TYPE="text". . . > for inputting a member ID is defined in line 2704, and the WWW browser displays the text input field. When the WWW opens the file order1.htm of HTML format, the display window 2604 appears. When the user inputs the member ID into the text input field and selects a confirmation button 2610, the WWW browser transmits the member ID to the WWW server. The WWW server confirms the received member ID, accepts the ordering and transmits HTML data which is the same data as PAGE003.HTM as the page to be next displayed. As a result, the WWW browser displays the display window 2603 again.

In this embodiment although the image file SPICE1.GIF is displayed in accordance with the description of line 2702, the image file may be transmitted from the WWW server, or may be used by storing in advance the file SPICE1.GIF into the same directory hierarchy of the interactive image recording medium 2301. Generally when the WWW browser uses such image file, the image file is obtained in reference to the recorded area of the displayed file of HTML format. In this embodiment, the file order1.htm of HTML format is obtained from the WWW server, therefore SPICE1.GIF is also obtained from the WWW server. Accordingly for display using SPICE1.GIF recorded in advance into the interactive image recording medium, the WWW browser is used having the function of retrieving whether or not the same file is present in the interactive image recording medium 2301 before obtaining the image file form the WWW server. The WWW browser having such function is preferably recorded in the PC data recording area 2403 in FIG. 24 as WWW-VIEW.EXE and used on demand. Further, the function of directory displaying files in the Video-CD data recording area (files in <VIDEO><MENU>) of the WWW browser dispenses with recording of the image file of the same pattern in the directory <WWW>-<GIF>, resulting in an increase in recording efficiency.

As the contents of AUTORUN.INF recorded in the PC data recording area 2403, one line such as "open"= "PCAP\STARTUP.EXE" is added and when the interactive image recording medium 2301 is recorded, the interactive image recording medium 2302 refers to the contents of the AUTORUN.INF to execute STARTUP.EXE. As the contents of STARTUP.EXE, the user selects whether to perform recording using the Video-CD or perform recording as the WWW browser using the communication function. For the Video-CD, the program VCDVIW.EXE recorded in the PC data recording area 2403 is executed whereas for the WWW browser, the program WWWVIEW.EXE recorded in the PC data recording area 2403 is executed.

As described above, in the interactive image recording medium 2301 since the recording medium reproduces the Video-CD image and the text data linked to the image data in the Video-CD recording area 2305 can be recorded in the HTML data recording area 2306, the browser can reproduce both data. Further, since the file contents of HTML format can be recorded in the HTML data recording area 2306, and description can be made to shift to the HTML file in the WWW server connectable through the communication means, it is made possible to provide latest (e.g., updated) data to the user which is not provided in the package medium such as the CD-ROM.

In addition, since all of file contents of HTML format is provided from the WWW server, description is made to use the image file recorded in advance in the interactive image recording medium 2301 and the WWW browser having the function of using the image file on demand is recorded in the same interactive image recording medium 2301, and it is possible to display the image file without transferring the image file through the communication means, thereby improving the image displaying speed.

In the above embodiments, although an optical disk, or CD-ROM is used as the interactive image recording medium 2301, any recording medium may be employed, for example, a magnetic recording system, semiconductor recording system or the like. Although the description has been made for the case using the interactive image recording system based of the Video-CD standard, any interactive image recording system may be used provided that the definition is made for the image data and the reproduction control data. Although the image data (<VIDEO><MENU> in FIG. 24), the image reproduction control data (<PBC> in FIG. 24), the image related data (<WWW> in FIG. 24) and the PC data (<PCAP> in FIG. 24) are recorded on a single medium, the PC data may be recorded in another medium.

Although the above-described exemplary directory structure is in conformity with the ISO 9960 standard, another file system may be employed. Further, it is not necessary to use a the directory structure having independent areas as <PCB>, <VIDEO>, <MENU>, <WWW> and <PCAP>.

Although the MPEG compression system is used as explaining the image data, other systems may also be employed. In this case, the interactive image reproducing means 2302 is preferably provided with reproducing means correlated to the image data.

As the reproducing means, the personal computer is used, however, any reproducing means may be used as long as provided with a Video-CD reproducing means and a WWW browser function.

In the interactive recording/reproducing system according to the present invention, as set forth hereinabove, since upon operation input from the user a corresponding reproduction procedure is acquired from the image reproduction control data, followed by reproduction of image data in accordance with the reproduction procedure, it is possible to effect an interactive reproduction. In addition, since image data and image related data are defined in a correlated manner by the relation defining information, and since image data, image reproduction control data, image related data and relation defining information are recorded on a single recording medium, it is possible to reproduce not only image data, but also image related data (e.g., ASCII text data) related to the image data being reproduced, whereby it becomes possible to include a large amount of information at a reduced data volume.

Further, using the functions of communication, printing and calculation which are unique to a personal computer, it is possible to combine image data with information controlled by the personal computer and make an order for commodities in mail order, printing of a collection of problems and simulation.

Additionally, since the interactive recording/reproducing method in question can have a plurality of image reproduction control methods, it is possible to select a reproducing method suitable for an intended use and hence possible to extend the interactive operation.

Further, since image related data related to image data such as character data and external information defining data for obtaining multimedia data through communication means are recorded in the same recording medium together with image data and image reproduction control data, in relation to interactive image data supplied through a package medium such as an optical disk, data can be supplied through a network.

In the above-described embodiments, and especially in implementations of a sensitive or confidential nature, it is desirable that the image reproduction control data management table be recorded in encryption form, i.e., in order to resist tampering therewith.

Although in the above-described embodiments a text character string is used as password, there may be used any other password form, e.g., numerical passwords, magnetic password card, etc. Further, although in this embodiment each password is given to the user by simultaneous display with image reproduction, there may be adopted any other method. For example, in the case where plural image reproduction control data are given to the user by a management or accounting department, a password may be given to the user at an appropriate time, e.g., at initiation of employment.

This concludes the description of the preferred embodiments.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the discussed combination arrangements within the scope of the foregoing disclosure, the drawings and the appended claims without departing from the spirit of the invention, e.g., the following represents a non-exhaustive list of modifications which might readily be apparent to one skilled in the art to which the present invention is directed.

According to this embodiment, as explained above, it is possible to record a plurality of image reproduction control data in the optical disk medium 101, whereby it is made possible to realize an interactive reproduction of image according to an intended use. Although the descriptions of the above embodiments premise the use of an optical disk medium 101, the same effect as above is obtainable also by the adoption of another recording method as long as such method adopted permits an interactive image reproduction. Further, although an interactive image reproduction method taking the Video-CD standard into consideration has been used in the above descriptions, there may be used another reproduction control method.

As a further possible alteration, although it has been described above that an image data, image reproduction control data, PC data, image-PC data link table, and reproduction application, are recorded in the same recording medium, the reproduction application may be recorded in another recording medium. Additionally, although it has been mentioned above that the directory structure of FIG. 2 conforms to ISO 9660, this does not constitute any limitation to the present invention if there is used any other recording method other than the method using an optical disk. Further, although it has been explained that all directories and files lie in the same route, it is not always necessary to do so if it is possible to manage the reproduction application in a differing structure. The directory and file names are not basic to those shown in FIG. 2. Also, it is not always necessary for the image-PC data link table to take the form of FIG. 8. For example, without designating text data in terms of the name of file, there may be used a data base with text data per se recorded therein. Even if keywords and text data are defined their related information using separate tables, there will be obtained the same effect as above.

As yet further possible variations, although in the above embodiments the PC data has been described as text data, there may be adopted another data form. For example, according to another data form which may be adopted, object data or the like for simulation are recorded as PC data and a calculating function for making a three-dimensional display of the object is imparted to the image data display control means, whereby the user can see a simulation image of the object on the PC data display screen while looking at a commentary on the image. Additionally, although it has been described above that an entirety of the image reproduction control data and image-PC data link table are read out and recorded during a single operation, only a portion thereof may be read out and recorded as necessary. In this case, the PC need not have storage means for storing each data. Further, although the image data has been described above as data compressed in accordance with the MPEG standard, the image data may be such data as has been compressed by another compressing method. In this case, the image data decoding means has a decoding function correspondingly to the image data compressing method adopted.

What is claimed and desired to be secured by the Letters Patent of the United States is:

1. An information medium comprising the following in common on a single medium:

first image data;

first image related data related to contents of the first image data;

first image reproduction control data for enabling reproduction of the first image data in accordance with the first image related data;

second image related data related to the contents of the first image data; and relation defining information defining at least a relation between the second image related data and the first image data, so as to enable reproduction of the first image data in relation to the second image related data.

2. An information medium further comprising:

first image data;

first image related data related to contents of the first image data;

first image reproduction control data for enabling reproduction of the first image data in accordance with the first image related data;

second image related data related to the contents of the first image data;

relation defining information defining at least a relation between the second image related data and the first image data, so as to enable reproduction of the first image data in relation to the second image related data; and second image reproduction control data for enabling reproduction of the second image related data in relation to the first image data with reference to said relation defining information.

3. An information medium comprising the following in common on a single medium:

first image data;

first image related data related to contents of the first image data;

first image reproduction control data for enabling reproduction of the first image data in accordance with the first image related data;

second image related data related to the contents of the first image data;

relation defining information defining at least a relation between the second image related data and the first image data, so as to enable reproduction of the first image data in relation to the second image related data; and said first image data is more specifically video image data;

said first image related data is more particularly static image data useable for reproduction on a video-CD player; and said second image related data is more particularly at least one of coded text data, picture data, addressing data and Internet link data directly useable for reproduction on a personal computer.

4. A medium as claimed in claim 3, wherein:

a combination of said first image data and said first image related data represents first interactive multimedia information useable for interactive reproduction on said video-CD player; and a combination of said first image data and said second image related data represents second interactive multimedia information useable for interactive reproduction on said personal computer.

5. A medium as claimed in claim 4, wherein:

said first interactive multimedia information conforms to a Video-CD standard; and said first interactive multimedia information and said second interactive multimedia information are recorded in accordance with an ISO 9660 standard.

6. An information medium comprising:

first image data;

first image related data related to contents of the first image data;

first image reproduction control data for enabling reproduction of the first image data in accordance with the first image related data;

second image related data related to the contents of the first image data; and relation defining information defining at least a relation between the second image related data and the first image data, so as to enable reproduction of the first image data in relation to the second image related data;

wherein said relation defining information more particularly defines a relation between the second image related data, the first image data and the first image related data, so as to enable reproduction of the second image related data, the first image data and the first image related data in relation to one another.

7. An information medium comprising:

first image data;

first image related data related to contents of the first image data;

first image reproduction control data for enabling reproduction of the first image data in accordance with the first image related data;

second image related data related to the contents of the first image data; and relation defining information defining at least a relation between the second image related data and the first image data, so as to enable reproduction of the first image data in relation to the second image related data;

wherein said first image reproduction control data more particularly comprises a plurality of different reproduction control data accessible in accordance with at least one of a date, time and password, each reproduction control data allowing reproduction of the first image data in relation with the first image related data only upon at least one of a respective date, time and input of a valid password.

8. An information medium further comprising:

first image data;

first image related data related to contents of the first image data;

first image reproduction control data for enabling reproduction of the first image data in accordance with the first image related data;

second image related data related to the contents of the first image data;

relation defining information defining at least a relation between the second image related data and the first image data, so as to enable reproduction of the first image data in relation to the second image related data; and keyword information indicating contents of said second image related data, wherein said relation defining information includes information indicating correspondence between said second image related data and said keyword information.

9. An information medium comprising:

first image data;

first image related data related to contents of the first image data;

first image reproduction control data for enabling reproduction of the first image data in accordance with the first image related data;

second image related data related to the contents of the first image data; and relation defining information defining at least a relation between the second image related data and the first image data, so as to enable reproduction of the first image data in relation to the second image related data;

wherein said first image data includes product introducing image data introducing products for sale, and said first image related data includes product information pieces of at least one of a name, number, price, color and size of each of the products introduced by said product introducing image data, and further includes communication procedure information pieces of at least one of a communication address and communication protocol for communication with a product order center which receives orders for products introduced by said product introducing image data.

10. An information medium further comprising:

first image data;

first image related data related to contents of the first image data;

first image reproduction control data for enabling reproduction of the first image data in accordance with the first image related data;

second image related data related to the contents of the first image data;

relation defining information defining at least a relation between the second image related data and the first image data, so as to enable reproduction of the first image data in relation to the second image related data; and operation input means which performs a reproducing operation for said first image data in an interactive manner;

image data reproducing means which receives an operation instruction from said operation input means, acquires a corresponding reproduction procedure from said first image reproduction control data, and reproduces said first image data in accordance with said reproduction procedure; and image related data reproducing means which acquires and reproduces said first image related data related to said first image data being reproduced on a basis of said relation defining information.

11. An information medium further comprising:

first image data;

first image related data related to contents of the first image data;

first image reproduction control data for enabling reproduction of the first image data in accordance with the first image related data;

second image related data related to the contents of the first image data;

relation defining information defining at least a relation between the second image related data and the first image data, so as to enable reproduction of the first image data in relation to the second image related data;

operation input means which performs a reproducing operation for said first image data in an interactive manner;

image data reproducing means which receives an operation instruction from said operation input means, acquires a corresponding reproduction procedure from said first image reproduction control data, and reproduces said first image data in accordance with said reproduction procedure; and image related data reproducing means which acquires and reproduces said first image related data related to said first image data being reproduced on a basis of said relation defining information, wherein said image related data reproducing means is provided with keyword input means for input of said keyword information, and receives said keyword information through said keyword input means, acquires from said relation defining information, said image related data corresponding to said received keyword information, and then reproduces at least one of an acquired first image related data and first image data.

12. A medium as claimed in claim 11, further comprising:

printing means for printing said first image related data and said first image data in combination with each other.

13. A multi-media information medium comprising the following in common on a single medium:

first image data;

first image related data related to contents of the first image data;

first relation defining information defining a relation between the first image related data and the first image data;

first image reproduction control data for enabling reproduction of the first image data in accordance with the first image related data;

second image related data related to the contents of the first image data; and second relation defining information defining at least a relation between the second image related data and the first image data.

14. An information medium for facilitating visual reproduction of information on at least two differing types of reproduction apparatus using at least a portion of image data in common, said medium comprising the following in common on a single medium:

first image data;

first image related data related to contents of the first image data, said first image related data useable for reproduction on a first reproduction apparatus of a first type;

first image reproduction control data for controlling reproduction of the first image data in relation with the first image related data on said first reproduction apparatus of said first type;

second image related data of a type different from a type of said first image related data, and being related to the contents of the first image data, said second image related data useable for reproduction on a second reproduction apparatus of a second type different from said first type; and relation defining information defining at least a relation between the second image related data and the first image data, so as to define reproduction of the first image data in relation to the second image related data on said second reproduction apparatus of said second type.

15. An information medium for facilitating visual reproduction of information on at least two differing types of reproduction apparatus using at least a portion of image data in common, said medium comprising:

first image data;

first image related data related to contents of the first image data, said first image related data useable for reproduction on a first reproduction apparatus of a first type;

first image reproduction control data for controlling reproduction of the first image data in relation with the first image related data on said first reproduction apparatus of said first type;

second image related data of a type different from a type of said first image related data, and being related to the contents of the first image data, said second image related data useable for reproduction on a second reproduction apparatus of a second type different from said first type;

relation defining information defining at least a relation between the second image related data and the first image data, so as to define reproduction of the first image data in relation to the second image related data on said second reproduction apparatus of said second type; and second image reproduction control data for controlling reproduction of the first image data in relation with the second image related data on said second reproduction apparatus of said second type, with reference to said relation defining information.

16. An information medium for facilitating visual reproduction of information on at least two differing types of reproduction apparatus using at least a portion of image data in common, said medium comprising the following in common on a single medium:

first image data;

first image related data related to contents of the first image data, said first image related data useable for reproduction on a first reproduction apparatus of a first type;

first image reproduction control data for controlling reproduction of the first image data in relation with the first image related data on said first reproduction apparatus of said first type;

second image related data of a type different from a type of said first image related data, and being related to the contents of the first image data, said second image related data useable for reproduction on a second reproduction apparatus of a second type different from said first type; and relation defining, information defining at least a relation between the second image related data and the first image data, so as to define reproduction of the first image data in relation to the second image related data on said second reproduction apparatus of said second type;

wherein said first image data is more specifically video image data;

said first image related data is more particularly static image data useable for reproduction on a video-CD player; and said second image related data is more particularly at least one of coded text data, picture data, addressing data and Internet link data directly useable for reproduction on a personal computer.

17. A medium as claimed in claim 16, wherein:

a combination of said first image data and said first image related data represents first interactive multimedia information useable for interactive reproduction on said video-CD player; and a combination of said first image data and said second image related data represents second interactive multimedia information useable for interactive reproduction on said personal computer.

18. A medium as claimed in claim 17, wherein:
said first interactive multimedia information conforms to a Video-CD standard; and
said first interactive multimedia information and said second interactive multimedia information are recorded in accordance with an ISO 9660 standard.

19. An information medium for facilitating visual reproduction of information on at least two differing types of reproduction apparatus using at least a portion of image data in common, said medium comprising:
first image data;
first image related data related to contents of the first image data, said first image related data useable for reproduction on a first reproduction apparatus of a first type;
first image reproduction control data for controlling reproduction of the first image data in relation with the first image related data on said first reproduction apparatus of said first type;
second image related data of a type different from a type of said first image related data, and being related to the contents of the first image data, said second image related data useable for reproduction on a second reproduction apparatus of a second type different from said first type; and
relation defining information defining at least a relation between the second image related data and the first image data, so as to define reproduction of the first image data in relation to the second image related data on said second reproduction apparatus of said second type;
wherein said relation defining information more particularly defines a relation between the second image related data, the first image data and the first image related data, so as to enable reproduction of the second image related data, the first image data and the first image related data in relation to one another.

20. An information medium for facilitating visual reproduction of information on at least two differing types of reproduction apparatus using at least a portion of image data in common, said medium comprising:
first image data;
first image related data related to contents of the first image data, said first image related data useable for reproduction on a first reproduction apparatus of a first type;
first image reproduction control data for controlling reproduction of the first image data in relation with the first image related data on said first reproduction apparatus of said first type;
second image related data of a type different from a type of said first image related data, and being related to the contents of the first image data, said second image related data useable for reproduction on a second reproduction apparatus of a second type different from said first type; and
relation defining information defining at least a relation between the second image related data and the first image data, so as to define reproduction of the first image data in relation to the second image related data on said second reproduction apparatus of said second type;
wherein said first image reproduction control data more particularly comprises a plurality of different reproduction control data accessible in accordance with at least one of a date, time and password, each reproduction control data allowing reproduction of the first image data in relation with the first image related data only upon at least one of a respective date, time and input of a valid password.

21. An information medium for facilitating visual reproduction of information on at least two differing types of reproduction apparatus using at least a portion of image data in common, said medium comprising:
first image data;
first image related data related to contents of the first image data, said first image related data useable for reproduction on a first reproduction apparatus of a first type;
first image reproduction control data for controlling reproduction of the first image data in relation with the first image related data on said first reproduction apparatus of said first type;
second image related data of a type different from a type of said first image related data, and being related to the contents of the first image data, said second image related data useable for reproduction on a second reproduction apparatus of a second type different from said first type;
relation defining information defining at least a relation between the second image related data and the first image data, so as to define reproduction of the first image data in relation to the second image related data on said second reproduction apparatus of said second type; and
keyword information indicating contents of said second image related data,
wherein said relation defining information includes information indicating correspondence between said second image related data and said keyword information.

22. An information medium for facilitating visual reproduction of information on at least two differing types of reproduction apparatus using at least a portion of image data in common, said medium comprising the following in common on a single medium:
first image data;
first image related data related to contents of the first image data, said first image related data useable for reproduction on a first reproduction apparatus of a first type;
first image reproduction control data for controlling reproduction of the first image data in relation with the first image related data on said first reproduction apparatus of said first type;
second image related data of a type different from a type of said first image related data, and being related to the contents of the first image data, said second image related data useable for reproduction on a second reproduction apparatus of a second type different from said first type; and
relation defining information defining at least a relation between the second image related data and the first image data, so as to define reproduction of the first image data in relation to the second image related data on said second reproduction apparatus of said second type;

wherein said medium is more specifically a CD-ROM;

said first image related data is more particularly useable for reproduction on a video-CD player; and said second image related data is more particularly useable for reproduction on a personal computer.

23. An information reproduction system for facilitating visual reproduction of information on at least two differing types of reproduction apparatus using at least a portion of image data in common said system comprising the following in common on a single medium:

first image data;

first image related data related to contents of the first image data, said first image related data useable for reproduction on a first reproduction apparatus of a first type;

first image reproduction control data for controlling reproduction of the first image data in relation with the first image related data on said first reproduction apparatus of said first type;

second image related data of a type different from a type of said first image related data, and being related to the contents of the first image data, said second image related data useable for reproduction on a second reproduction apparatus of a second type different from said first type; and relation defining information defining at least a relation between the second image related data and the first image data, so as to define reproduction of the first image data in relation to the second image related data on said second reproduction apparatus of said second type;

second image reproduction control data for controlling reproduction of the first image data in relation with the second image related data on said second reproduction apparatus of said second type, with reference to said relation defining information;

said medium is more specifically a CD-ROM;

said first image related data is more particularly useable for reproduction on a video-CD player; and said second image related data is more particularly useable for reproduction on a personal computer;

a video-CD player arranged for receiving said first image data, said first image related data and said first image reproduction control data from said CD-ROM medium, and for performing visual reproduction of the first image data in relation with said first image related data in accordance with said first image reproduction control data; and a personal computer arranged for receiving said first image data, and said second image related data from said CD-ROM medium, and for performing visual reproduction of the first image data in relation with said second image related data in accordance with said second image reproduction control data.

24. An information system for facilitating visual reproduction of information on at least two differing types of reproduction apparatus using at least a portion of image data in common, said system comprising the following in common on a single medium:

first image data;

first image related data related to contents of the first image data, said first image related data useable for reproduction on a first reproduction apparatus of a first type;

first image reproduction control data for controlling reproduction of the first image data in relation with the first image related data on said first reproduction apparatus of said first type;

second image related data of a type different from a type of said first image related data, and being related to the contents of the first image data, said second image related data useable for reproduction on a second reproduction apparatus of a second type different from said first type;

relation defining information defining at least a relation between the second image related data and the first image data, so as to define reproduction of the first image data in relation to the second image related data on said second reproduction apparatus of said second type;

second image reproduction control data for controlling reproduction of the first image data in relation with the second image related data on said second reproduction apparatus of said second type, with reference to said relation defining information;

said medium is more specifically a CD-ROM;

said first image related data is more particularly useable for reproduction on a video-CD player; and said second image related data is more particularly useable for reproduction on a personal computer;

a video-CD player arranged for receiving said first image data, said first image related data and said first image reproduction control data from said CD-ROM medium, and for performing visual reproduction of the first image data in relation with said first image related data in accordance with said first image reproduction control data; and a personal computer arranged for receiving said first image data, and said second image related data from said CD-ROM medium, and for performing visual reproduction of the first image data in relation with said second image related data in accordance with said second image reproduction control data;

wherein said medium includes, as said first image data, product introducing image data which introduces products for sale, and as said first image related data, product information pieces including at least one of a name, number, price, color and size of each of the products introduced by said product introducing image data, and further includes communication procedure information pieces of at least one of a communication address and communication protocol for communication with a product order center; and further comprising:

communication means for making communication with the product order center which receives orders for the products introduced by said product introducing image data, and said image related data reproducing means transmits said product information pieces from said communication means to said product order center in accordance with said communication procedure information.

25. An information reproduction system for facilitating visual reproduction of information on at least two differing types of reproduction apparatus using at least a portion of image data in common, said system comprising the following in common on a single medium:

first image data;

first image related data related to contents of the first image data, said first image related data useable for reproduction on a first reproduction apparatus of a first type;

first image reproduction control data for controlling reproduction of the first image data in relation with the first image related data on said first reproduction apparatus of said first type;

second image related data of a type different from a type of said first image related data, and being related to the contents of the first image data, said second image related data useable for reproduction on a second reproduction apparatus of a second type different from said first type;

relation defining information defining at least a relation between the second image related data and the first image data, so as to define reproduction of the first image data in relation to the second image related data on said second reproduction apparatus of said second type;

second image reproduction control data for controlling reproduction of the first image data in relation with the second image related data on said second reproduction apparatus of said second type, with reference to said relation defining information;

said medium is more specifically a CD-ROM;

said first image related data is more particularly useable for reproduction on a video-CD player; and said second image related data is more particularly useable for reproduction on a personal computer;

a video-CD player arranged for receiving said first image data, said first image related data and said first image reproduction control data from said CD-ROM medium, and for performing visual reproduction of the first image data in relation with said first image related data in accordance with said first image reproduction control data; and a personal computer arranged for receiving said first image data, and said second image related data from said CD-ROM medium, and for performing visual reproduction of the first image data in relation with said second image related data in accordance with said second image reproduction control data;

at least one of said video-CD player and said computer obtains, from outside said reproduction system using communication means, third image related data and external information defining data defining a relationship of said third image related data and said first image data.

26. A reproduction system as claimed in claim 25, wherein:

said relation defining information is recorded as a file of a HTML (Hyper Text Markup Language) format.

27. A reproduction system as claimed in claim 26, further comprising:

a reproducing program for reproducing said third image related data with reference to said file of HTML format.

28. An information medium comprising:

first image data;

first image related data related to contents of the first image data;

first image reproduction control data which defines images played in response to user operations while said first image is playing;

relation defining information which defines at least a relation between the first image related data and an identifier in the first image reproduction control data, so as to enable reproduction of the first image data in relation to the first image related data.

29. An information medium for facilitating visual reproduction of information on at least two differing types of reproduction apparatus using at least a portion of image data in common, said medium comprising:

first image data;

first image related data related to contents of the first image data, said first image related data useable for reproduction on a first reproduction apparatus of a first type;

first image reproduction control data which defines second images played in response to user operations while said first image is playing, on said first reproduction apparatus of said first type;

second image related data of a type different from a type of said first image related data, and being related to the contents of the first image data, said second image related data useable for reproduction on a second reproduction apparatus of a second type different from said first type; and relation defining information which defines at least a relation between the second image related data and an identifier in the first image reproduction control data, so as to enable reproduction of the first image data in relation to the second image related data, on said second reproduction apparatus of said second type.

* * * * *